(12) United States Patent
Katayama et al.

(10) Patent No.: US 10,079,032 B2
(45) Date of Patent: Sep. 18, 2018

(54) DEVICE AND RECORDING APPARATUS

(71) Applicants: InnovaStella Co., Ltd., Tokyo (JP); SCHOOL JURIDICAL PERSON OF FUKUOKA KOGYO DAIGAKU, Fukuoka (JP)

(72) Inventors: Ryuichi Katayama, Fukuoka (JP); Katsumi Yoshizawa, Tokyo (JP); Satoshi Sugiura, Tokyo (JP); Takayuki Kasuya, Tokyo (JP)

(73) Assignees: INNOVASTELLA CO., LTD, Tokyo (JP); SCHOOL JURIDICAL PERSON OF FUKUOKA KOGYO DAIGAKU, Fukuoka (JP)

( * ) Notice: Subject to any disclaimer, the term of this patent is extended or adjusted under 35 U.S.C. 154(b) by 0 days.

(21) Appl. No.: 15/316,611

(22) PCT Filed: Jun. 6, 2014

(86) PCT No.: PCT/JP2014/065062
§ 371 (c)(1),
(2) Date: Dec. 6, 2016

(87) PCT Pub. No.: WO2015/186240
PCT Pub. Date: Dec. 10, 2015

(65) Prior Publication Data
US 2017/0140778 A1 May 18, 2017

(51) Int. Cl.
*G11B 5/02* (2006.01)
*G11B 11/00* (2006.01)
(Continued)

(52) U.S. Cl.
CPC .............. *G11B 5/012* (2013.01); *G11B 5/31* (2013.01); *G11B 2005/0021* (2013.01)

(58) Field of Classification Search
CPC ....... G11B 2220/90; G11B 27/36; G11B 5/54; G11B 2220/20; G11B 5/09;
(Continued)

(56) References Cited

U.S. PATENT DOCUMENTS

| 7,911,883 B2 * | 3/2011 | Sasaki | G11B 5/3116 360/59 |
| 8,139,447 B2 * | 3/2012 | Sasaki | G11B 5/3116 360/59 |

(Continued)

FOREIGN PATENT DOCUMENTS

| JP | 2004-303299 | 10/2004 |
| JP | 2010-066401 | 3/2010 |

(Continued)

OTHER PUBLICATIONS

International Search Report, PCT/JP2014/065062, dated Sep. 9, 2014.

*Primary Examiner* — Nabil Hindi
(74) *Attorney, Agent, or Firm* — Young & Thompson

(57) ABSTRACT

A combination of a semiconductor member and a metal member is selected appropriately from a view point of increasing an enhancement factor of a near-field light. A device (1) has a semiconductor member (101) and a metal member (102), a near-field light is generated at the metal member when an energy is supplied to the semiconductor member, the metal member is made of an alloy including a first metal and a second metal, a condition of Rm1<Rs<Rm2 is satisfied, wherein a resonance wavelength of the first metal is Rm1, a resonance wavelength of the second metal is Rm2, and a resonance wavelength of the semiconductor member is Rs.

21 Claims, 17 Drawing Sheets

(51) Int. Cl.
*G11B 5/012* (2006.01)
*G11B 5/31* (2006.01)
*G11B 5/00* (2006.01)

(58) Field of Classification Search
CPC .... G11B 2005/0021; G11B 2005/0005; G11B 5/314; G11B 11/10558; G11B 11/10543; G11B 11/10554
USPC ............. 360/59, 313, 328; 369/13.13, 13.32, 369/13.33, 124.27
See application file for complete search history.

(56) References Cited

U.S. PATENT DOCUMENTS

| | | | |
|---|---|---|---|
| 8,208,214 B2* | 6/2012 | Iwata | G11B 5/3903 360/125.31 |
| 8,830,801 B2 | 9/2014 | Yoshizawa et al. | |
| 8,958,168 B1* | 2/2015 | Yuan | G11B 5/1278 360/122 |
| 2004/0194119 A1 | 9/2004 | Miyanishi et al. | |
| 2014/0036647 A1 | 2/2014 | Yoshizawa et al. | |
| 2014/0050058 A1 | 2/2014 | Zou et al. | |

FOREIGN PATENT DOCUMENTS

| | | |
|---|---|---|
| JP | 2010-129166 | 6/2010 |
| JP | 2010-146638 | 7/2010 |
| WO | WO 2012/111816 | 8/2012 |
| WO | WO 2014/024306 | 2/2014 |

* cited by examiner

[FIG. 1]
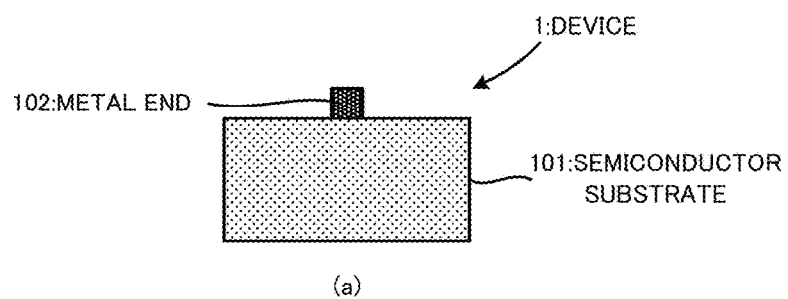
(a)
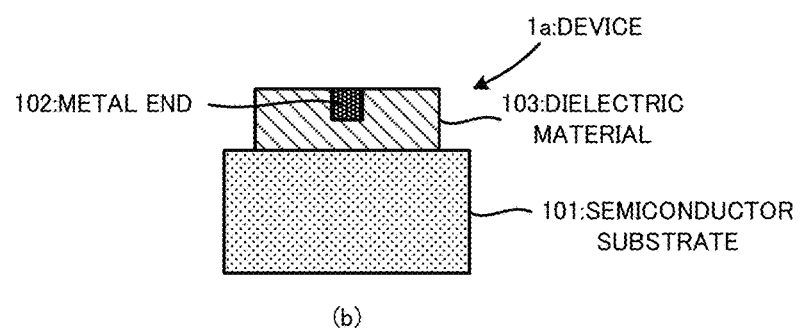
(b)
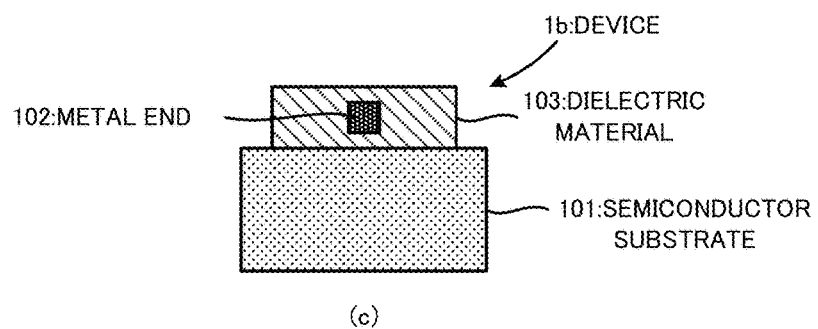
(c)

[FIG. 2]
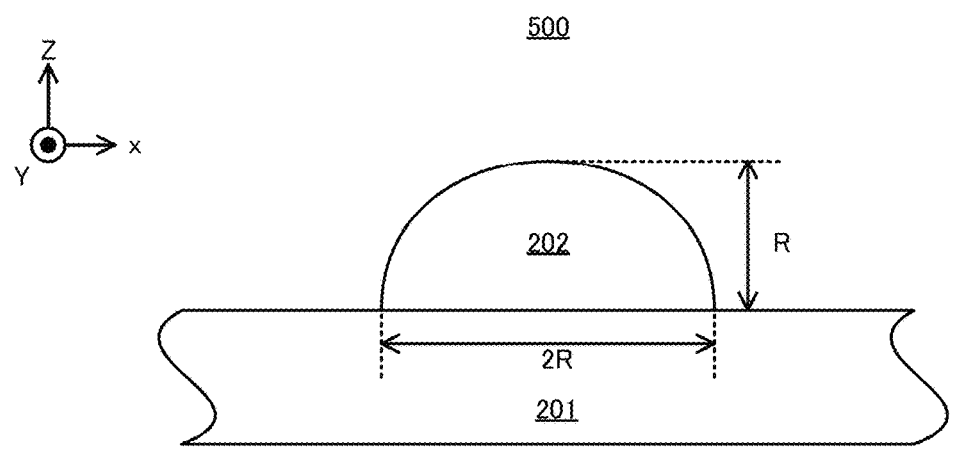

[FIG. 3]
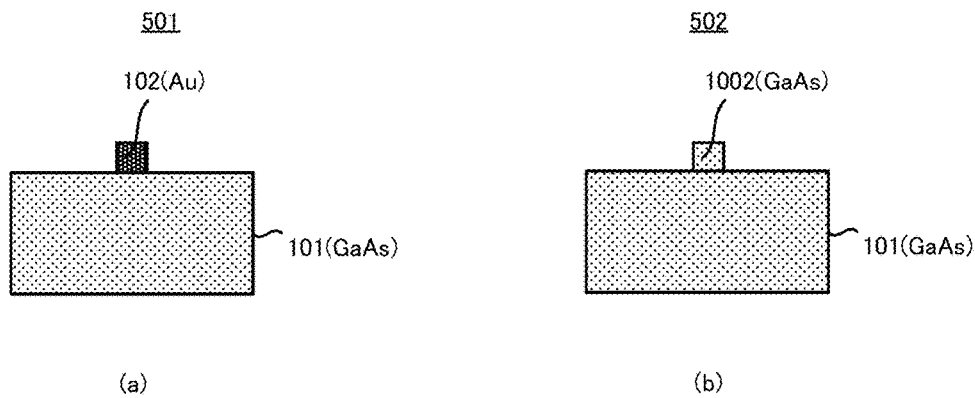
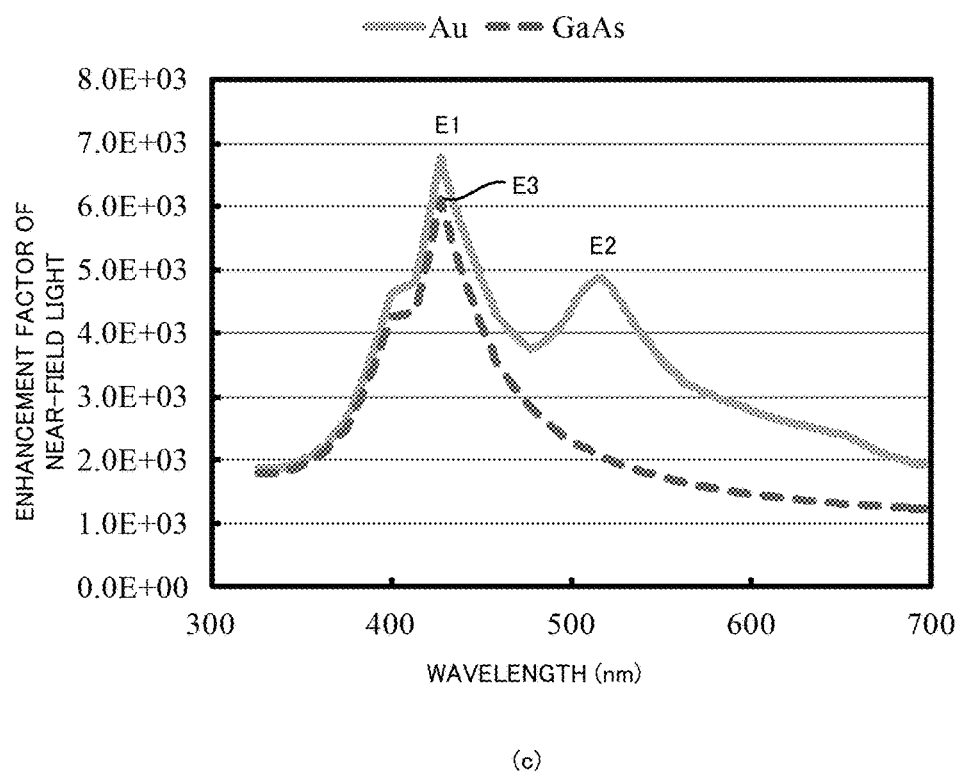

[FIG. 4]
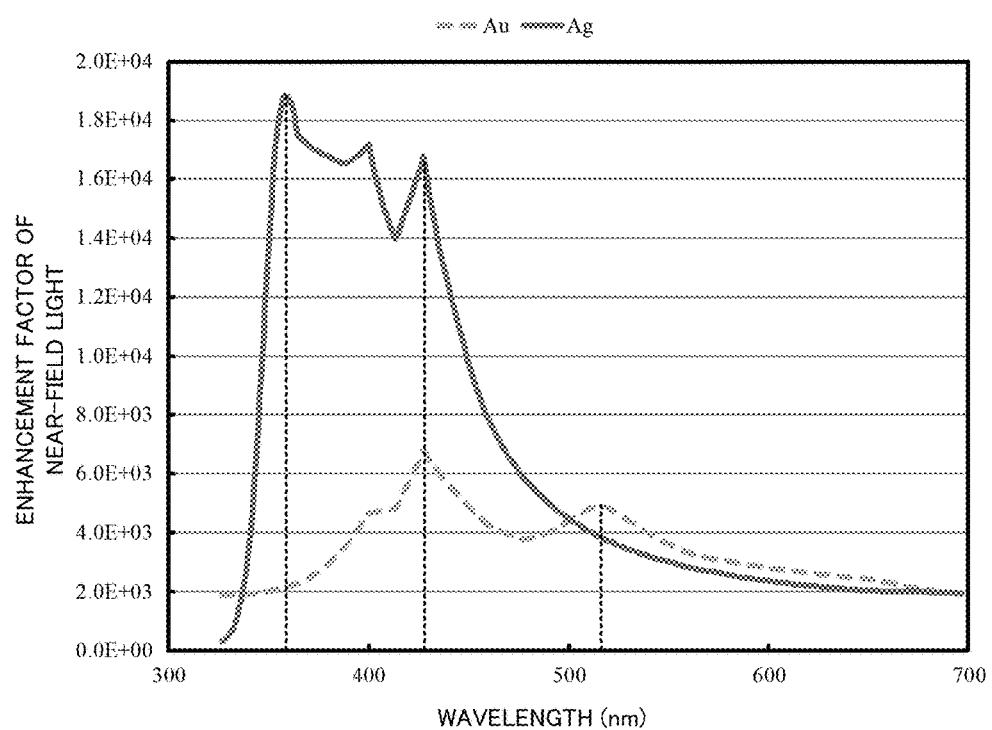

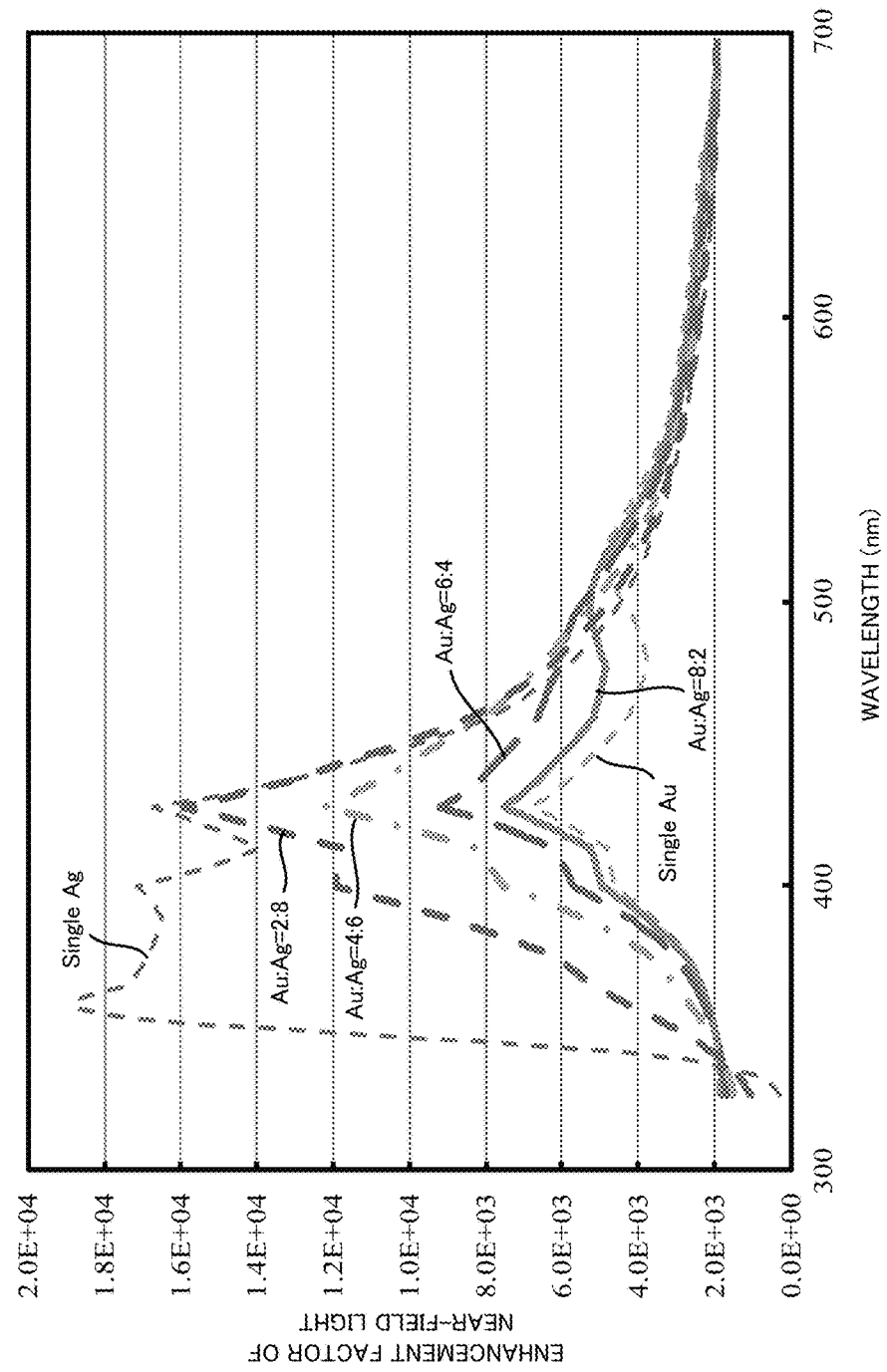
[FIG. 5]

[FIG. 6]
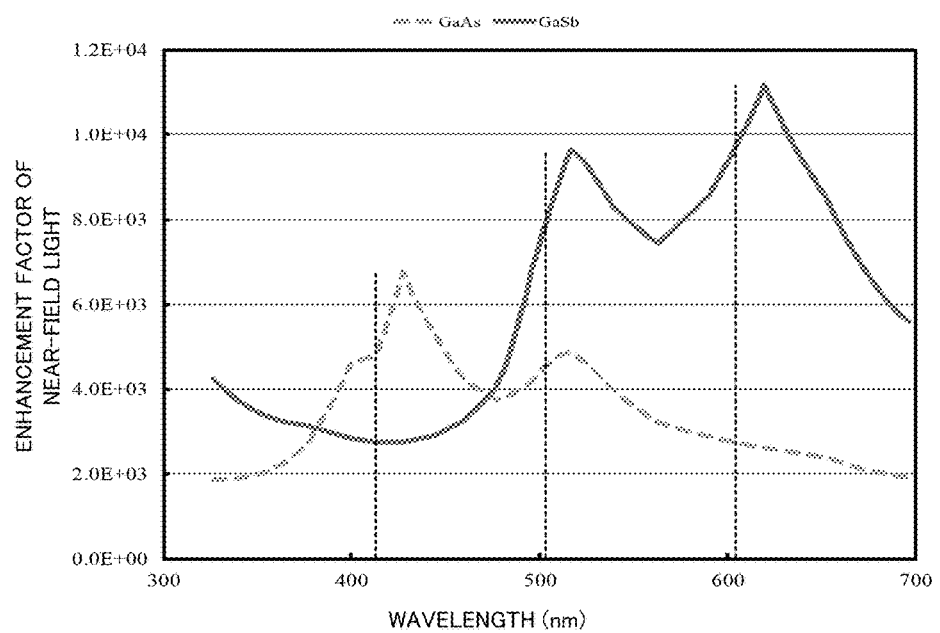

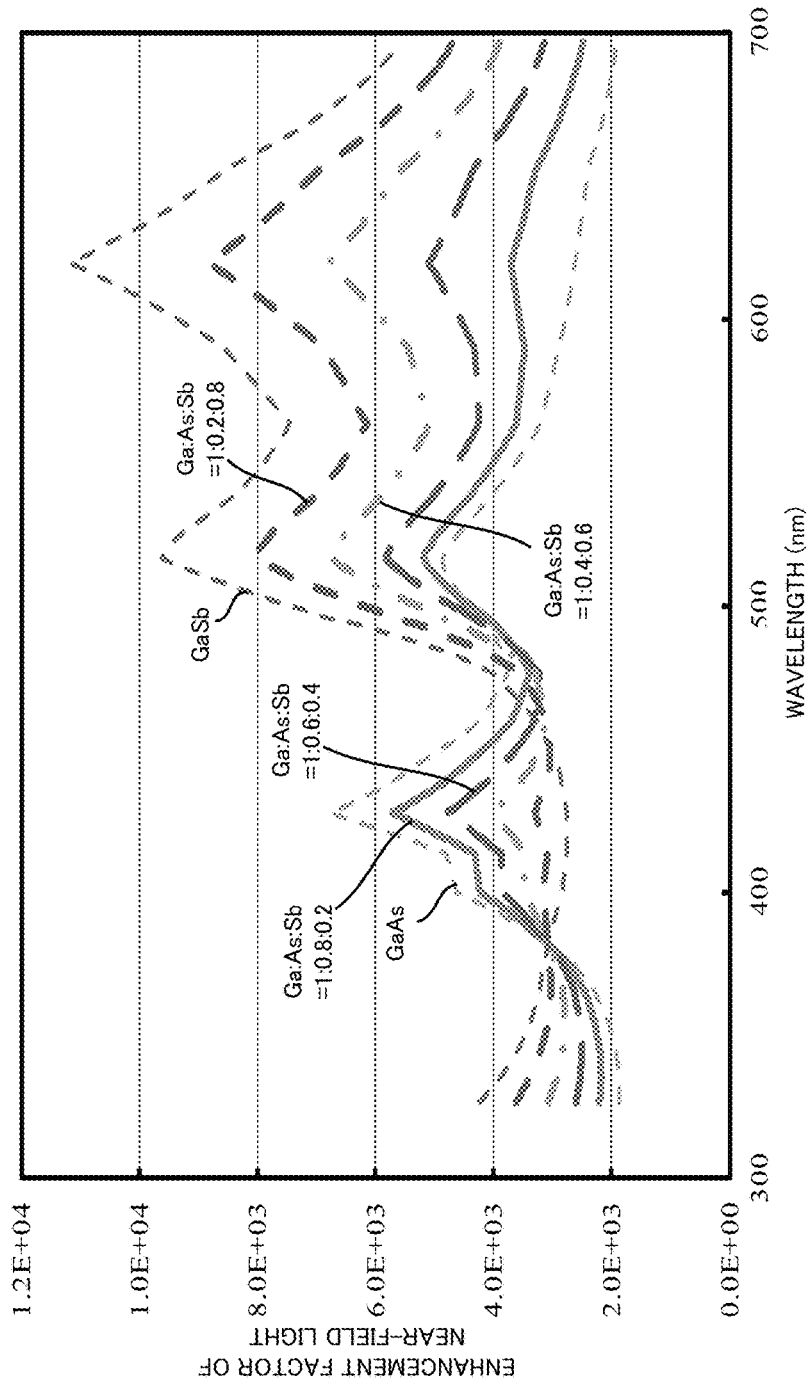
[FIG. 7]

[FIG. 8]
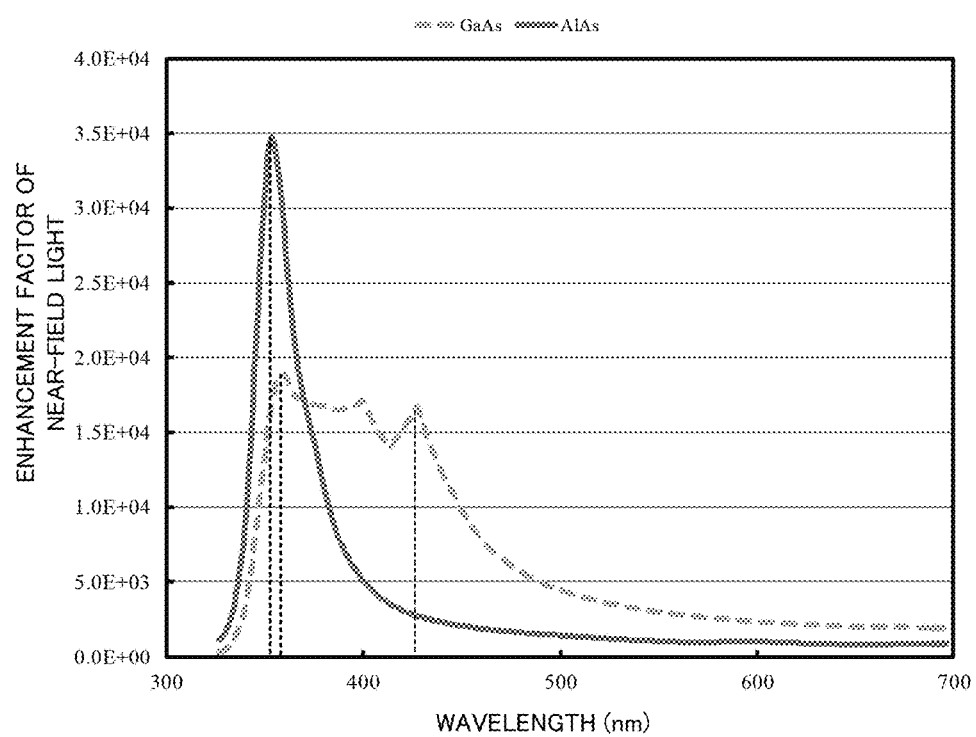

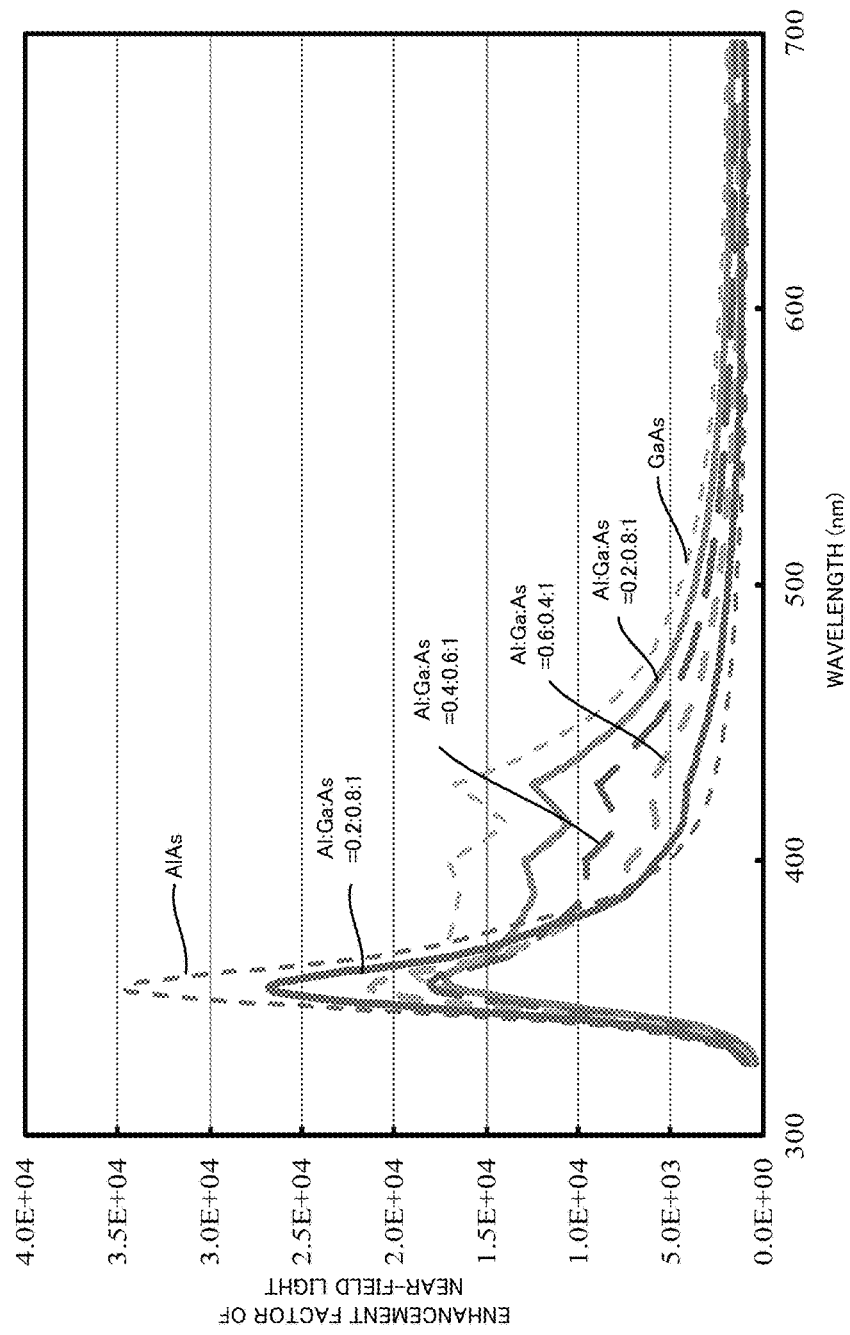
[FIG. 9]

[FIG. 10]
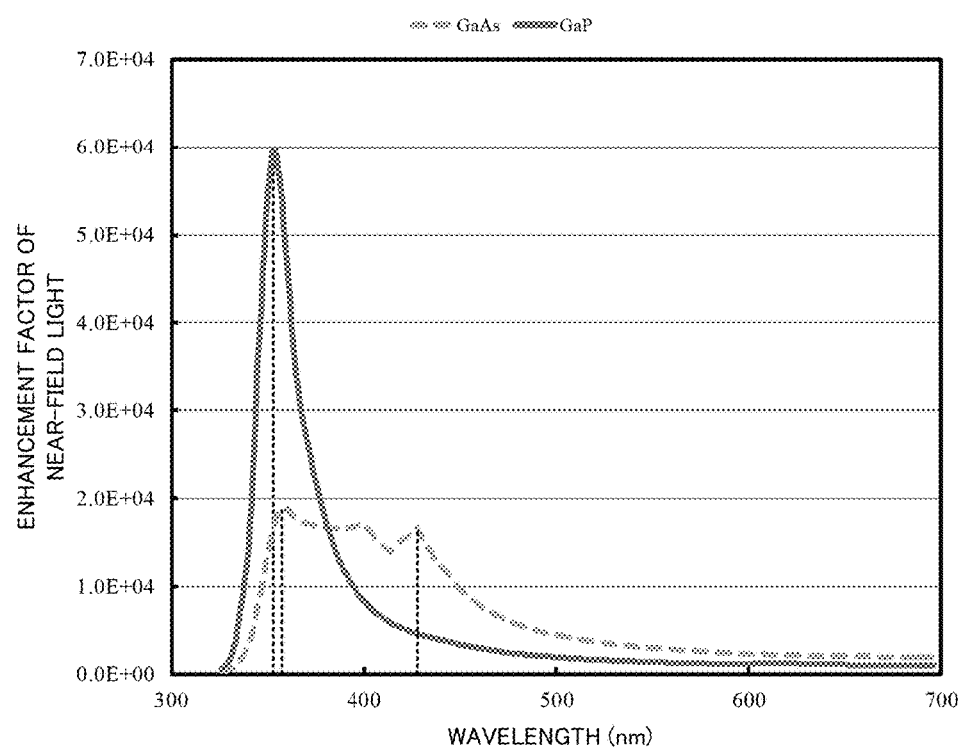

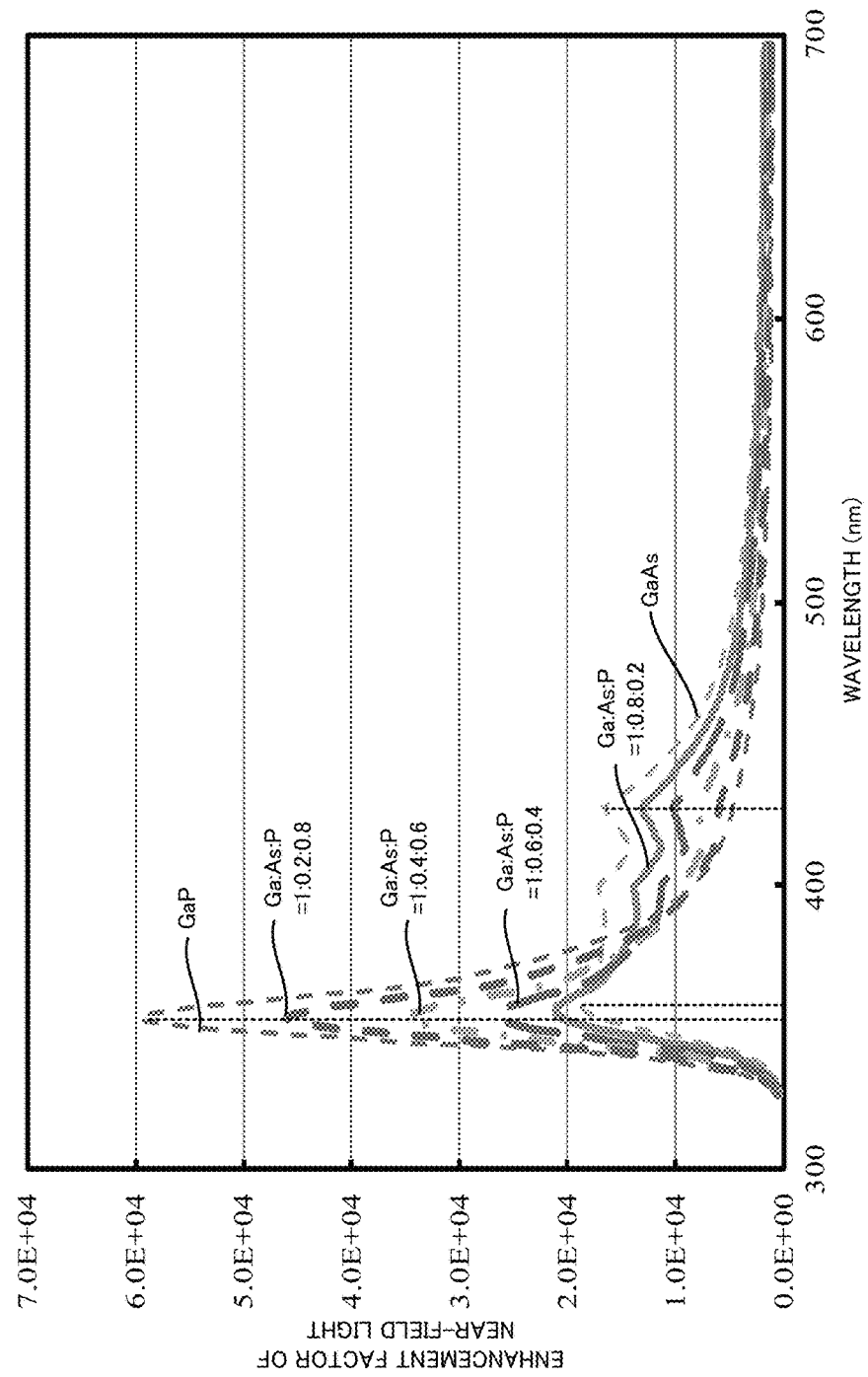
[FIG. 11]

[FIG. 12]
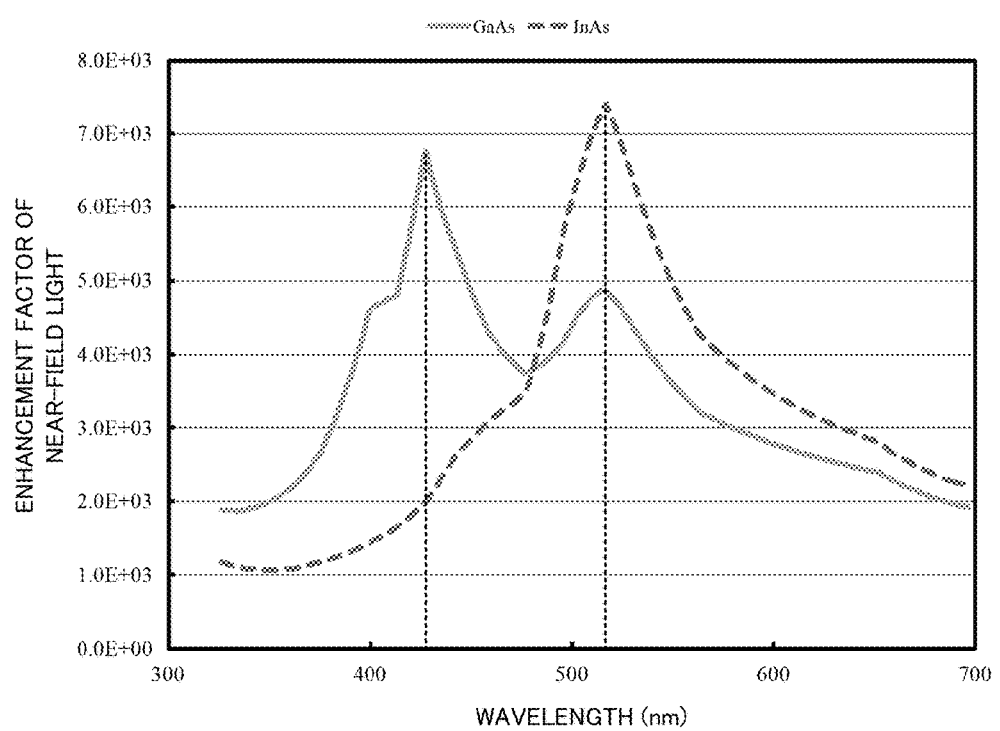

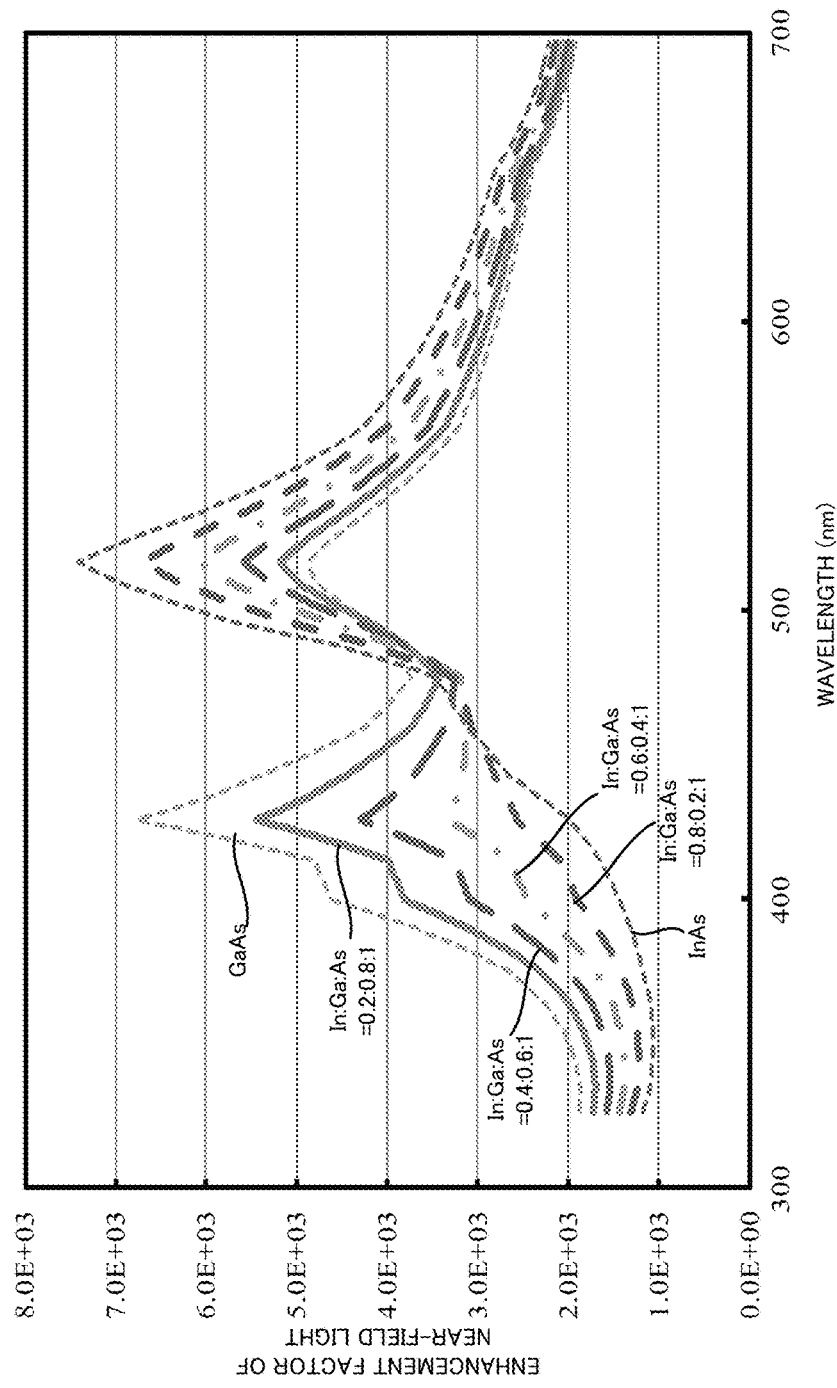
[FIG. 13]

[FIG. 14]
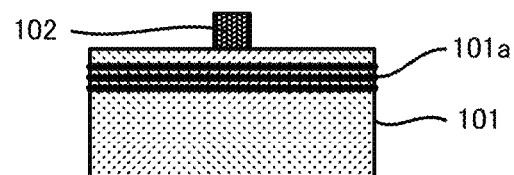
(a)
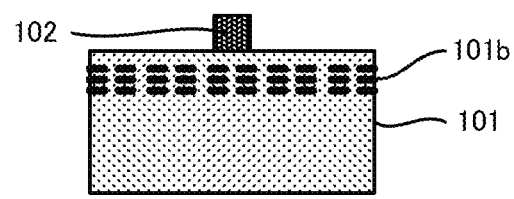
(b)
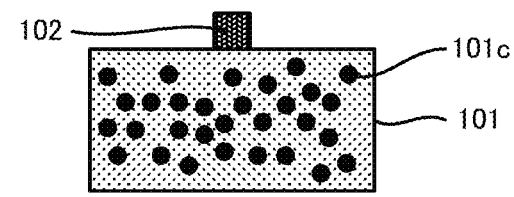
(c)
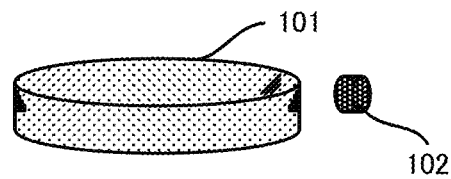
(d)

[FIG. 15]
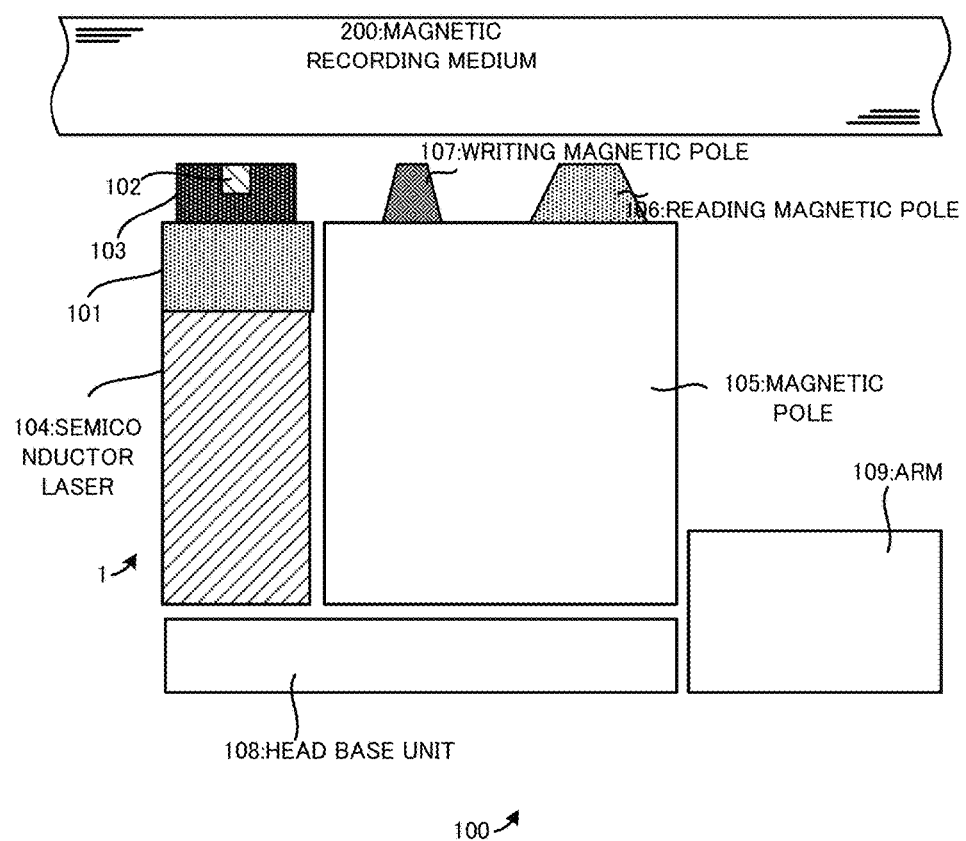

[FIG. 16]
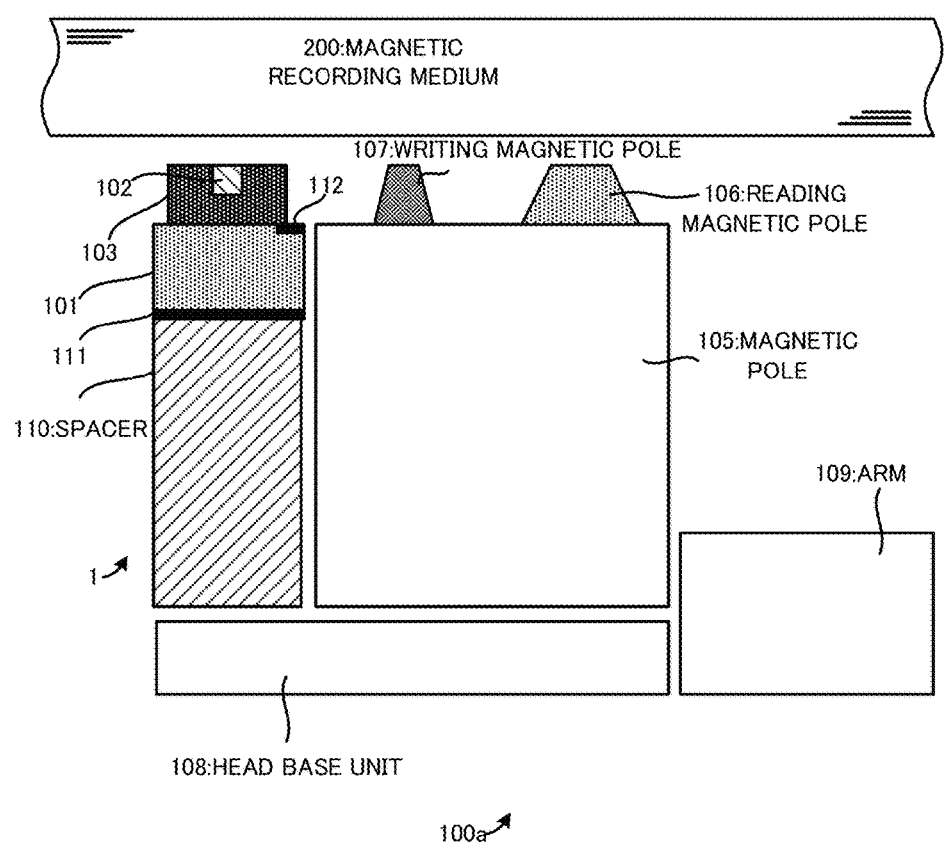

[FIG. 17]
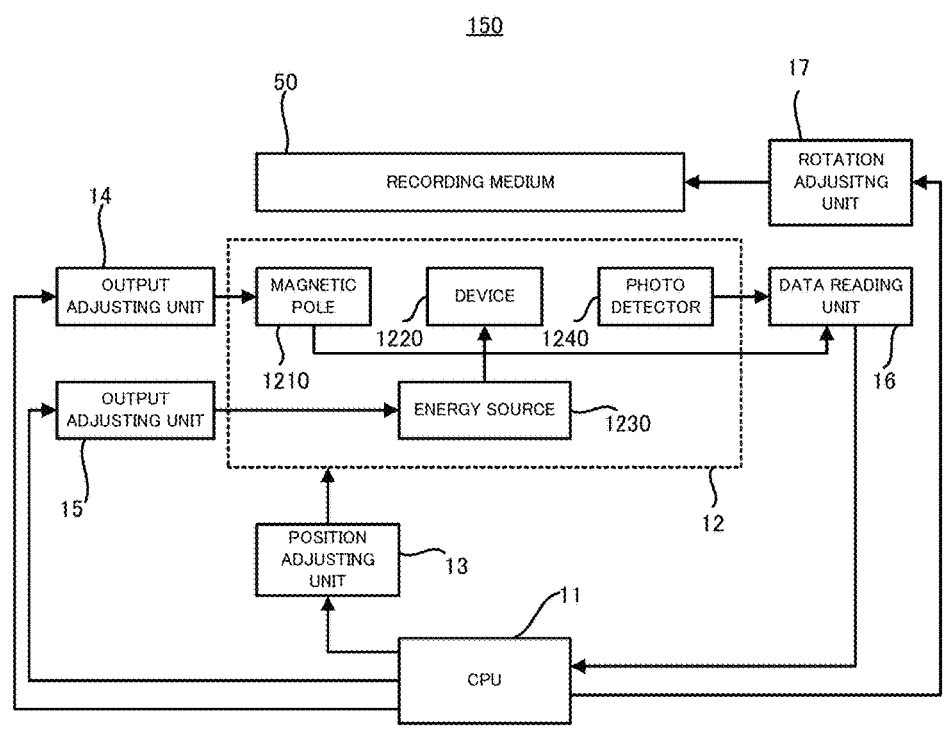

DEVICE AND RECORDING APPARATUS

TECHNICAL FIELD

The present invention relates to a device for forming a micro heat spot that is required for a heat assisted magnetic recording method and a recording apparatus using this device, for example.

BACKGROUND ART

There is a method of decreasing diameter of magnetic particles that constitute a magnetic recording medium, as one example of a method of increasing a recording density by a magnetic recording. However, the smaller the diameters of the magnetic particles that constitute the magnetic recording medium are, the more a thermal fluctuation increases. As a result, there is a possibility that a recording state is unstable. As one example of a method of preventing the increasing of this thermal fluctuation, there is a method of increasing a magnetic coercive force of the magnetic recording medium. On the other hand, a magnitude of a magnetic field generated by a magnetic head is limited, and thus there is a possibility that the recording to the magnetic recording medium is difficult or impossible due to the increasing of the magnetic coercive force of the magnetic recording medium.

Thus, a HAMR (Heat Assisted Magnetic Recording) method that is allowed to temporality decreasing the magnetic coercive force of the magnetic recording medium in the recording by forming a heat spot on the magnetic recording medium by using a light irradiated to the magnetic recording medium in the recording is attracting an attention. In the HAMR recording method, it is preferable that a diameter of the heat spot be small to be dozens of nanometers that is about same as a size of a recording mark. In order to form the heat spot having this micro diameter (typically, having a diameter that is equal to or smaller than a diffraction limitation), it is preferable to use a near-field light.

Thus, as a device using the near-field light, near-field light devices having various structures are proposed. For example, a Patent Literature 1 discloses a near-field light device that has: a semiconductor substrate including quantum dots; and a metal end (an output end) that is formed on the semiconductor substrate. A Patent Literature 2 discloses a near-field light device having a NFT (Near Field Transducer). A Patent Literature 3 discloses a near-field light device in which a layer-structured metal end (a metal antenna) for generating the near-field light is formed on a semiconductor substrate. A Patent Literature 4 discloses a near-field light device in which a metal end (a metal antenna) for generating the near-field light is formed on a semiconductor substrate through a dielectric layer.

CITATION LIST

Patent Literature

Patent Literature 1: International Publication No. WO2012/111816
Patent Literature 2: United States Patent Application Publication No. 2014/0050058
Patent Literature 3: Japanese Unexamined Patent Application Publication No. 2010-129166
Patent Literature 4: Japanese Unexamined Patent Application Publication No. 2010-146638

SUMMARY OF INVENTION

Technical Problem

By the way, the Patent Literature 1 discloses an example in which GaAs is used as a material of the semiconductor substrate and Au is used as a material of the metal end. The Patent Literature 2 does not disclose a specific material of the NFT. The Patent Literature 3 discloses an example in which either one of SiC, AlP, ZnO, ZnS, ZnSe, GaN and $TiO_2$ is used as a material of the semiconductor substrate and two types of metals that are allowed to be in a resonant state with respect to different wavelengths are used as materials of the metal end. The Patent Literature 4 discloses an example in which either one of SiC, AlP, ZnO, ZnS, ZnSe, GaN and $TiO_2$ is used as a material of the semiconductor substrate and either one of Pt, Mg, Au, Al and Ag is used as a material of the metal end. However, the Patent Literature 1 to the Patent Literature 4 do not disclose a method of selecting the combination of the semiconductor substrate and the metal end from a view point of increasing an enhancement factor of the near-field light (namely, a ratio of the intensity of the near-field light that is emitted from the metal end with respect to an intensity of an incident light that enters the semiconductor substrate). Thus, it is expected that the selection of the combination of the semiconductor substrate and the metal end stands further improvement from the view point of increasing the enhancement factor of the near-field light.

It is an object of the present invention to provide a device in which a combination of a semiconductor member and a metal member is selected appropriately from a view point of increasing an enhancement factor of a near-field light and a recording apparatus having this device.

Solution to Problem

A first device is a device that is provided with: a semiconductor member and a metal member, a near-field light is generated at the metal member when an energy is supplied to the semiconductor member, the metal member is made of an alloy including a first metal and a second metal, a condition of $Rm1<Rs<Rm2$ is satisfied, a resonance wavelength of the first metal is $Rm1$, a resonance wavelength of the second metal is $Rm2$, and a resonance wavelength of the semiconductor member is $Rs$.

A second device is a device that is provided with: a semiconductor member and a metal member, a near-field light is generated at the metal member when an energy is supplied to the semiconductor member, the semiconductor member is made of a mixed crystal including a first element, a second element and a third element, a condition of $Rs1<Rm<Rs2$ is satisfied, a resonance wavelength of a first mixed crystal including the first element and the second element of the mixed crystal is $Rs1$, a resonance wavelength of a second mixed crystal including the first element and the third element of the mixed crystal is $Rs2$, and a resonance wavelength of the metal member is $Rm$.

A third device is a device that is provided with: a semiconductor member and a metal member, a near-field light is generated at the metal member when an energy is supplied to the semiconductor member, the metal member is made of an alloy in which at least a first metal and a second metal are mixed at a predetermined mixing ratio.

A fourth device is a device that is provided with: a semiconductor member and a metal member, a near-field light is generated at the metal member when an energy is supplied to the semiconductor member, the semiconductor member is made of a mixed crystal including at least a first element, a second element and a third element.

A first recording apparatus has any one of the above described first to fourth devices.

A second recording apparatus is provided with: a recording head that is configured to record information on a disc; a rotating mechanism that is configured to rotate the disc; and a controlling device that is configured to control the recording head and the rotating mechanism, the recording head has any one of the above described first device to the fourth device.

A recording apparatus of the present invention includes the device of the present invention.

These operations and other advantages of the present invention will become more apparent from embodiments explained below.

BRIEF DESCRIPTION OF DRAWINGS

FIG. 1 is a side view that illustrates a structure of a device in a first example.

FIG. 2 is a drawing describing a simulation model for simulating an enhancement factor of a near-field light of the device.

FIG. 3 is a drawing and graph for describing a definition of a resonance wavelength in the device.

FIG. 4 is a graph illustrating a relationship between a wavelength of the incident light and an enhancement factor of the near-field light in each of a device in which a metal member is made of Au and a semiconductor member is made of GaAs and a device in which a metal member is made of Ag and a semiconductor member is made of GaAs.

FIG. 5 is a graph illustrating the relationship between the wavelength of the incident light and the enhancement factor of the near-field light when a mixing ratio of Au and Ag is varied in a device in which the metal member is made of an alloy of Au and Ag and the semiconductor member is made of GaAs.

FIG. 6 is a graph illustrating a relationship between the wavelength of the incident light and the enhancement factor of the near-field light in each of a device in which the metal member is made of Au and the semiconductor member is made of GaAs and a device in which the metal member is made of Au and the semiconductor member is made of GaSb.

FIG. 7 is a graph illustrating the relationship between the wavelength of the incident light and the enhancement factor of the near-field light when a mixing ratio of As and Sb is varied in a device in which the metal member is made of Au and the semiconductor member is made of a mixed crystal including Ga, As and Sb.

FIG. 8 is a graph illustrating a relationship between the wavelength of the incident light and the enhancement factor of the near-field light in each of a device in which the metal member is made of Ag and the semiconductor member is made of GaAs and a device in which the metal member is made of Ag and the semiconductor member is made of AlAs.

FIG. 9 is a graph illustrating the relationship between the wavelength of the incident light and the enhancement factor of the near-field light when a mixing ratio of Ga and Al is varied in a device in which the metal member is made of Ag and the semiconductor member is made of a mixed crystal including Ga, Al and As.

FIG. 10 is a graph illustrating a relationship between the wavelength of the incident light and the enhancement factor of the near-field light in each of a device in which the metal member is made of Ag and the semiconductor member is made of GaAs and a device in which the metal member is made of Ag and the semiconductor member is made of GaP.

FIG. 11 is a graph illustrating the relationship between the wavelength of the incident light and the enhancement factor of the near-field light when a mixing ratio of As and P is varied in a device in which the metal member is made of Ag and the semiconductor member is made of a mixed crystal including Ga, As and P.

FIG. 12 is a graph illustrating a relationship between the wavelength of the incident light and the enhancement factor of the near-field light in each of a device in which the metal member is made of Au and the semiconductor member is made of GaAs and a device in which the metal member is made of Au and the semiconductor member is made of InAs.

FIG. 13 is a graph illustrating the relationship between the wavelength of the incident light and the enhancement factor of the near-field light when a mixing ratio of Ga and In is varied in a device in which the metal member is made of Au and the semiconductor member is made of a mixed crystal including Ga, In and As.

FIG. 14 is a side view illustrating a modified example of the semiconductor member of the device.

FIG. 15 is a side view illustrating a magnetic head having a light excitation type of device.

FIG. 16 is a side view illustrating a magnetic head having a current injection type of device.

FIG. 17 is a block diagram illustrating a structure of a hard disk drive on which the magnetic head having the device of the present invention is mounted.

DESCRIPTION OF EMBODIMENTS

An embodiment of each of a device and a recording apparatus will be described below.

<1>

A device in a first embodiment is a device that is provided with: a semiconductor member and a metal member, a near-field light is generated at the metal member when an energy is supplied to the semiconductor member, the metal member is made of an alloy including a first metal and a second metal, a condition of Rm1<Rs<Rm2 is satisfied, a resonance wavelength of the first metal is Rm1, a resonance wavelength of the second metal is Rm2, and a resonance wavelength of the semiconductor member is Rs.

According to the device in the first embodiment, the metal member is made of the alloy including the first metal (typically, a single metal) having the resonance wavelength of Rm1 and the second metal (typically, a single metal) having the resonance wavelength of Rm2. Furthermore, the semiconductor member is made of a semiconductor material having the resonance wavelength of Rs that satisfies Rm1<Rs<Rm2 (namely, the resonance wavelength Rs of the semiconductor member is between Rm1 and Rm2). Thus, it is possible to vary an enhancement factor of the near-field light in the vicinity of Rs that is the resonance wavelength of the semiconductor member by varying a mixing ratio of the first metal and the second metal. As a result, a combination of the semiconductor member and the metal member can be selected appropriately from the view point of increasing the enhancement factor of the near-field light.

<2>

Another aspect of a device in a second embodiment is a device that is provided with: a semiconductor member and a metal member, a near-field light is generated at the metal member when an energy is supplied to the semiconductor member, the semiconductor member is made of a mixed crystal including a first element, a second element and a third element, a condition of Rs1<Rm<Rs2 is satisfied, a resonance wavelength of a first mixed crystal including the first element and the second element of the mixed crystal is Rs1, a resonance wavelength of a second mixed crystal including the first element and the third element of the mixed crystal is Rs2, and a resonance wavelength of the metal member is Rm.

According to the device in the second embodiment, the semiconductor member is made of a semiconductor material that is made of the mixed crystal including the first mixed crystal that includes the first and second elements and that has the resonance wavelength of Rs1 and the second mixed crystal that includes the first and third elements and that has the resonance wavelength of Rs2. Furthermore, the metal member is made of a metal material having the resonance wavelength of Rm that satisfies Rs1<Rm<Rs2 (namely, the resonance wavelength Rm of the metal member is between Rs1 and Rs2). Thus, it is possible to vary an enhancement factor of the near-field light in the vicinity of Rm that is the resonance wavelength of the metal member by varying a mixing ratio of the first mixed crystal and the second mixed crystal (in other words, by varying a mixing ratio of the first element, the second element and the third element). As a result, a combination of the semiconductor member and the metal member can be selected appropriately from the view point of increasing the enhancement factor of the near-field light.

<3>

In another aspect of the device in the first embodiment or the second embodiment (furthermore, in a third embodiment or a fourth embodiment described later), the resonance wavelength is a wavelength that is specific to each of the metal member and the semiconductor member and at which an enhancement factor of the near-field light becomes locally maximum.

According to this aspect, when the above described condition regarding this resonance wavelength is satisfied, it is possible to increase the enhancement factor of the near-field light.

<4>

A device in a third embodiment is a device that is provided with: a semiconductor member and a metal member, a near-field light is generated at the metal member when an energy is supplied to the semiconductor member, the metal member is made of an alloy in which at least a first metal and a second metal are mixed at a predetermined mixing ratio.

According to the device in the third embodiment, it is possible to vary an enhancement factor of the near-field light in the vicinity of a resonance wavelength of the semiconductor member by varying a mixing ratio of the first metal and the second metal. As a result, a combination of the semiconductor member and the metal member can be selected appropriately from the view point of increasing the enhancement factor of the near-field light.

<5>

In another aspect of the device in the first embodiment or the third embodiment, the first metal is a gold (Au) and the second metal is a silver (Ag).

According to this aspect, it is possible to vary the enhancement factor of the near-field light in the vicinity of the resonance wavelength of the semiconductor member by varying the mixing ratio of the gold that is the first metal and the silver that is the second metal. As a result, it is possible to increase the enhancement factor of the near-field light.

<6>

In another aspect of the device in the first embodiment or the third embodiment, the semiconductor member is made of GaAs.

According to this aspect, it is possible to vary the enhancement factor of the near-field light in the vicinity of the resonance wavelength of GaAs that is the semiconductor member. As a result, it is possible to increase the enhancement factor of the near-field light.

<7>

A device in a fourth embodiment is a device that is provided with: a semiconductor member and a metal member, a near-field light is generated at the metal member when an energy is supplied to the semiconductor member, the semiconductor member is made of a mixed crystal including at least a first element, a second element and a third element.

According to the device in the fourth embodiment, it is possible to vary an enhancement factor of the near-field light in the vicinity of a resonance wavelength of the metal member by varying a mixing ratio of the first element, the second element and the third element. As a result, a combination of the semiconductor member and the metal member can be selected appropriately from the view point of increasing the enhancement factor of the near-field light.

<8>

In another aspect of the device in the second embodiment or the fourth embodiment, the first element is Ga, the second element is As and the third element is In, Al, Sb or P.

According to this aspect, it is possible to vary the enhancement factor of the near-field light in the vicinity of the resonance wavelength of the metal member by varying a mixing ratio of Ga that is the first element, As that is the second element and In, Al, Sb or P that is the third element. As a result, it is possible to increase the enhancement factor of the near-field light.

<9>

In another aspect of the device in the second embodiment or the fourth embodiment, the metal member is a gold (Au) or a silver (Ag).

According to this aspect, it is possible to vary the enhancement factor of the near-field light in the vicinity of the resonance wavelength of the gold or the silver that is the metal member by varying a mixing ratio of the first element, the second element and the third element. As a result, it is possible to increase the enhancement factor of the near-field light.

<10>

In another aspect of the device in any one of the first embodiment to the fourth embodiment, the metal member is made of an alloy member including a plurality of metals.

According to this aspect, it is possible to set the enhancement factor of the near-field light in the vicinity of the resonance wavelength of the semiconductor member to a desired value by varying a ratio of the plurality of metals.

<11>

In another aspect of the device in the present embodiment, the semiconductor member is made of a mixed crystal including at least three elements.

According to this aspect, it is possible to set the enhancement factor of the near-field light in the vicinity of the resonance wavelength of the metal member to a desired value by selecting the three elements and varying a mixing ratio of these elements.

(An Embodiment of a Recording Apparatus)
<12>

A recording apparatus in a first embodiment has the device in any one of the above described first embodiment to the fourth embodiment (in this regard, including various aspects thereof).

According to the recording apparatus in the first embodiment, it is possible to perform a recording operation with respect to a recording medium (for example, a heat assisted magnetic recording operation with respect to a magnetic recording medium) while achieving various effects that can be achieved by the above described device in any one of the first embodiment to the fourth embodiment.
<13>

Another aspect of the recording apparatus in the first embodiment is further provided with a light source that is configured to irradiate the semiconductor member with a light having a predetermined wavelength.

According to this aspect, it is possible to locally maximize the enhancement factor of the near-field light when the wavelength of the light from the light source is closer to (preferably, is same as) the resonance wavelength of the metal member or the resonance wavelength of the semiconductor member.
<14>

Another aspect of the recording apparatus in the first embodiment is further provided with a pair of electrodes that are connected to the semiconductor member of the device.

According to this aspect, it is possible to supply an electrical current to a semiconductor substrate via the pair of the electrodes. As a result, the semiconductor substrate itself is capable of emitting the light having the wavelength corresponding to (preferably, same as) the resonance wavelength of the metal member or the resonance wavelength of the semiconductor member, and an external light source is not needed.
<15>

Another aspect of the recording apparatus in the first embodiment is further provided with a writing magnetic pole.

According to this aspect, the recording apparatus is capable of performing the recording operation with respect to the recording medium (for example, the heat assisted magnetic recording operation with respect to the magnetic recording medium).
<16>

A recording apparatus in the second embodiment is provided with: a recording head having the device in any one of the above described first embodiment to the fourth embodiment (in this regard, including various aspects thereof); a rotating mechanism that is configured to rotate a disc; and a controlling device that is configured to control the recording head and the rotating mechanism.

According to the recording apparatus in the second embodiment, a heat spot corresponding to a size of the metal member can be formed on the disc. It is possible to perform the magnetic recording on the disc with high density when the size of the metal member becomes dozens of nanometers.

These operations and other advantages of the present embodiment will become more apparent from examples explained below.

As described above, the device in the first embodiment satisfies the condition of Rm1<Rs<Rm2, wherein the resonance wavelength of the first metal is Rm1, the resonance wavelength of the second metal is Rm2, and the resonance wavelength of the semiconductor member is Rs. The device in the second embodiment satisfies the condition of Rs1<Rm<Rs2, wherein the resonance wavelength of the first mixed crystal is Rs1, the resonance wavelength of the second mixed crystal is Rs2, and the resonance wavelength of the metal member is Rm. The device in the third embodiment is a device having the metal member made of the alloy in which at least the first metal and the second metal are mixed by the predetermined mixing ratio. The device in the fourth embodiment has the semiconductor member made of the mixed crystal including at least the first element, the second element and the third element. The recording apparatus in the first embodiment or the second embodiment has the device in any one of the first embodiment to the fourth embodiment. The combination of the semiconductor member and the metal member is selected appropriately from the view point of increasing the enhancement factor of the near-field light.

EXAMPLE

With reference to drawings, an example of each of a device and a recording apparatus will be described below. Note that a scale of each layer and a scale of each member vary in order to illustrate each layer and each member in a perceptible size on the drawings, in the following drawings.

(1) A First Example of a Device

Firstly, with reference to FIG. 1, a device 1 in a first example will be described. FIG. 1(a) is a side view that illustrates a structure of the device 1 in the first example.

As illustrated in FIG. 1, the device 1 is provided with: a semiconductor substrate 101 that is one example of the "semiconductor member"; and a metal end 102 that is one example of the "metal member". The semiconductor substrate 101 is a substrate that is made of GaAs (gallium arsenide). The metal end 102 is an output end that is made of an alloy in which Au and Ag are mixed at a predetermined ratio.

FIG. 1(b) and FIG. 1(c) illustrate modified examples of the device 1 having a dielectric material 103 that is formed around the metal end 102. FIG. 1(b) illustrates a device 1a in a first modified example having the dielectric material 103 that is formed so that a surface of the metal end 102 is exposed. FIG. 1(c) illustrates a device 1b in a second modified example having the dielectric material 103 that is formed so that the metal end 102 is covered by the dielectric material 103. A material such as $SiO_x$ is used as the dielectric material 103.

This device 1 generates a near-field light at the metal end 102 in the following aspect. Firstly, a not-illustrated semiconductor laser or the like irradiate a surface among surfaces of the semiconductor substrate 101 that is opposite to a surface on which the dielectric material 103 and the metal end 102 are formed with an incident light. The incident light passes through the semiconductor substrate 101 to be irradiated on the metal end 102. As a result, the near-field light is generated around the metal end 102.

Next, a simulation that was performed by the inventor of the present application regarding an intensity of the near-field light generated at the metal end 102 of the device 1 will be described.

FIG. 2 illustrates a simulation model 500. The simulation model 500 is a device model having a semiconductor substrate 201 and a metal end 202. The metal end 202 is a half sphere having a radius R. The metal end 202 is formed on the semiconductor substrate 201. An XY plane that is parallel to a surface of the semiconductor substrate 201 and a z axis that is perpendicular to this XY plane are defined.

It is assumed that an external electrical field in the semiconductor substrate 201 is uniformed (namely, an incident light to the semiconductor substrate 201 is a planar wave) and an amplitude of the external electrical field is represented by E0. Moreover, a sum of an amplitude of the near-field light and an amplitude of a transmitted light at a head of the metal end 202 is represented by E. Here, a square of |E/E0| is defined as the enhancement factor of the near-field light. It is assumed that a direction of the external electrical field in the semiconductor substrate 201 is a z direction (namely, a direction of a polarization of the incident light to the semiconductor substrate 201 is the z direction). A wavelength of the incident light is varied within a range of 300 nm to 700 nm. A quasi electrostatic approximation is used for the calculation.

This simulation is described in detail in JOURNAL OF APPLIED PHYSICS Vol. 115, 17B728 (2014), 'Simulation on near-field light generated by AU nano-dot on GaAs substrate for heat assisted magnetic recording heat source'.

Performing the calculation by using the simulation model in FIG. 2 and plotting the wavelength of the incident light on a horizontal axis and the enhancement factor of the near-field light on a vertical axis found that the enhancement factor of the near-field light is locally maximized when the incident light having the wavelength that is specific to the material constituting each of the semiconductor substrate 201 and the metal end 202 enters the semiconductor substrate 201. This wavelength at which the enhancement factor of the near-field light is locally maximized is defined as a resonance wavelength in the present invention.

Next, with reference to FIG. 3, the resonance wavelength and the near-field light will be described. FIG. 3(a) is a side view of a simulation model 501 in which the metal end 102 that is made of a gold (Au) is formed on the semiconductor substrate 101 that is made of GaAs. FIG. 3(b) is a side view of a simulation model 502 in which a semiconductor end 1002 that is made of GaAs instead of the metal end 102 is formed on the semiconductor substrate 101 that is made of GaAs. FIG. 3(c) is a graph illustrating a result obtained by performing the above described simulation (namely, the simulation relating to the intensity of the near-field light generated at the metal end 102 and the semiconductor end 1002) on both models. Specifically, FIG. 3(c) is a graph in which the enhancement factor of the near-field light generated at the metal end 102 that is Au and the enhancement factor of the near-field light generated at the semiconductor end 1002 that is GaAs are plotted on the vertical axis and the wavelength λ of the incident light entering the semiconductor substrate 101 is plotted at the horizontal axis.

As illustrated in FIG. 3(b), the simulation model 502 has the semiconductor end 1002 that is made of a material (GaAs in the simulation model 502) same as the material of the semiconductor substrate 101, instead of the metal end 102. Performing the simulation by which the incident light is irradiated while varying the wavelength λ on the simulation model 502 found that the enhancement factor of the near-field light has a local maximum value E3 when the wavelength λ is about 430 nm, as illustrated in the graph of a dashed line in FIG. 3(c).

As illustrated in FIG. 3(a), the simulation model 501 includes two materials that are Au constituting the metal end 102 and GaAs constituting the semiconductor substrate 101. Performing the simulation by which the incident light is irradiated while varying the wavelength λ on the simulation model 501 found that the enhancement factor of the near-field light has a local maximum value E1 when the wavelength λ is about 430 nm and the enhancement factor of the near-field light has a local maximum value E2 when the wavelength λ is about 520 nm, as illustrated in the graph of a solid line in FIG. 3(c). Since each of the local maximum values E1 and E3 is a local maximum value of the enhancement factor of the near-field light when the wavelength λ is about 430 nm, the wavelength of 430 nm is a wavelength specific to GaAs constituting the semiconductor substrate 101 and the semiconductor end 1002. In the present example, the wavelength that is specific to a semiconductor member constituting the semiconductor substrate 101 among the wavelengths λ at each of which the enhancement factor of the near-field light has the local maximum value is defined as a resonance wavelength Rs of the semiconductor member. Moreover, the wavelength of 520 nm at which the enhancement factor of the near-field light has the local maximum value E2 is a wavelength specific to Au constituting the metal end 102. In the present example, the wavelength that is specific to a metal member constituting the metal end 102 among the wavelengths λ at each of which the enhancement factor of the near-field light has the local maximum value is defined as a resonance wavelength Rm of the metal member.

When the wavelength λ of the incident light becomes closer to (preferably, same as) the resonance wavelength Rm of the metal member constituting the metal end 102 or the resonance wavelength Rs of the semiconductor member constituting the semiconductor substrate 101 on the device 1 having the metal end 102 and the semiconductor substrate 101, the enhancement factor of the near-field light generated at the metal end 102 can be increased, compared to the case where the wavelength λ of the incident light is set without considering the resonance wavelength Rm or the resonance wavelength Rs.

Next, with reference to FIG. 4 and FIG. 5, the device 1 in the first example (namely, the device 1 in which the semiconductor substrate 101 is made of GaAs and the metal end 102 is made of the alloy of Au and Ag) will be described.

Firstly, FIG. 4 is a graph illustrating a result (a dashed line) of the simulation on the device in which the metal end 102 is made of Au and the semiconductor substrate 101 is made of GaAs and a result (a solid line) of the simulation on the device in which the metal end 102 is made of Ag and the semiconductor substrate 101 is made of GaAs. The graph in FIG. 4 found that the resonance wavelength Rm2 specific to Au is 520 nm, the resonance wavelength Rm1 specific to Ag is 360 nm, and the resonance wavelength Rs specific to GaAs is 430 nm.

Next, FIG. 5 is a graph illustrating, as well as a ratio of Au and Ag, a relationship between the wavelengths λ of the incident light and the enhancement factor of the near-field light on the device 1 in the first example having the semiconductor substrate 101 that is made of GaAs and the metal end 102 that is made of the alloy of Au and Ag. Specifically, FIG. 5 illustrates the relationship between the wavelengths λ of the incident light and the enhancement factor of the near-field light in each of the case where the ratio of Au and Ag is "8:2", the case where the ratio of Au and Ag is "6:4", the case where the ratio of Au and Ag is "4:6", and the case where the ratio of Au and Ag is "2:8". Moreover, FIG. 5 illustrates the relationship between the wavelengths λ and the enhancement factor in each of the case where the metal end 102 is single Au and the case where the metal end 102 is single Ag for reference.

When the metal member constituting the metal end 102 is the single Au, the enhancement factor of the near-field light is relatively high at a wavelength near the resonance wavelength Rm2 (520 nm) specific to Au. Here, when Ag is mixed to the metal member constituting the metal end 102, the enhancement factor of the near-field light is also relatively high at a wavelength near the resonance wavelength Rm1 (360 nm) specific to Ag. As a result, the enhancement factor of the near-field light is especially high at an intermediate wavelength between the resonance wavelength Rm2 and the resonance wavelength Rm1. The resonance wavelength Rs (430 nm) specific to GaAs is the intermediate wavelength between the resonance wavelength Rm2 and the resonance wavelength Rm1, and thus it is possible to effectively increase the enhancement factor of the near-field light at the resonance wavelength Rs specific to GaAs by using the alloy of Au and Ag as the metal member constituting the metal end 102, in the first example.

Actually, the local maximum value of the enhancement factor of the near-field light at the resonance wavelength Rs (430 nm) specific to GaAs is about 6800, when the metal end 102 is made of the single Au. On the other hand, the local maximum value of the enhancement factor of the near-field light at the resonance wavelength Rs specific to GaAs is about 7500, when the metal end 102 is made of the alloy in which Au and Ag are mixed at a ratio of "8:2". The local maximum value of the enhancement factor of the near-field light at the resonance wavelength Rs specific to GaAs is about 9200, when the metal end 102 is made of the alloy in which Au and Ag are mixed at a ratio of "6:4". The local maximum value of the enhancement factor of the near-field light at the resonance wavelength Rs specific to GaAs is about 12300, when the metal end 102 is made of the alloy in which Au and Ag are mixed at a ratio of "4:6". The local maximum value of the enhancement factor of the near-field light at the resonance wavelength Rs specific to GaAs is about 15900, when the metal end 102 is made of the alloy in which Au and Ag are mixed at a ratio of "2:8". Namely, if the ratio of Ag in the alloy constituting the metal end 102 increases, the enhancement factor of the near-field light at the resonance wavelength Rs specific to GaAs becomes higher, compared to the case where the metal end 102 is made of the single Au.

By this, when the metal end 102 of the device 1 is made of the alloy including a first metal (Ag in the first example) having the resonance wavelength Rm1 smaller than the resonance wavelength Rs specific to GaAs that is the semiconductor member constituting the semiconductor substrate 101 and a second metal (Au in the first example) having the resonance wavelength Rm2 larger than the resonance wavelength Rs specific to GaAs, it is possible to control the enhancement factor of the near-field light at the resonance wavelength Rs specific to the semiconductor member constituting the semiconductor substrate 101 of the device 1.

Namely, when the metal end 102 is made of the alloy of a first single metal and a second single metal, it is possible to control the enhancement factor of the near-field light at the resonance wavelength Rs specific to the semiconductor member constituting the semiconductor substrate 101 of the device 1 by selecting the first metal, the second metal and the semiconductor member so that a condition of Rm1<Rs<Rm2 is satisfied, wherein the resonance wavelength of the first single metal is Rm1, the resonance wavelength of the second single metal is Rm2, and the resonance wavelength specific to the semiconductor member constituting the semiconductor substrate 101 is Rs. According to the device 1 in the first example, when the incident light having the wavelength that is same as the resonance wavelength Rs (430 nm) specific to GaAs is emitted from the semiconductor substrate 101 side, the enhancement factor of the near-field light generated at the metal end 102 that is made of the alloy of Au and Ag can be set to be higher, compared to the case where the metal end 102 is made of the single Au.

(2) A Second Example of a Device

Next, with reference to FIG. 6 and FIG. 7, a device 2 in a second example will be described.

A structure of the device 2 in the second example is same as that of the device 1 in the first example illustrated in FIG. 1. However, in the second example, the semiconductor member constituting the semiconductor substrate 101 and the metal member constituting the metal end 102 are different from those in the first example. In the device 2, the semiconductor member is a mixed crystal including three elements (for example, a mixed crystal including Ga (gallium) that is a first element, As (arsenic) that is a second element and Sb (antimony) that is a third element). Moreover, the metal member is Au.

FIG. 6 is a graph illustrating a result (a dashed line) of the simulation on the simulation model in which the metal end 102 that is made of Au is formed on the semiconductor substrate 101 that is made of GaAs (namely, a first mixed crystal including Ga that is the first element and As that is the second element) and a result (a solid line) of the simulation on the simulation model in which the metal end 102 that is made of Au is formed on the semiconductor substrate 101 that is made of GaSb (namely, a second mixed crystal including Ga that is the first element and Sb that is the third element). The graph in FIG. 6 found that the resonance wavelength Rm specific to Au is 520 nm, the resonance wavelength Rs1 specific to GaAs that is the first mixed crystal is 430 nm, and the resonance wavelength Rs2 specific to GaSb that is the second mixed crystal is 620 nm.

Next, FIG. 7 is a graph illustrating, as well as a ratio of Ga, As and Sb, a relationship between the wavelengths λ of the incident light and the enhancement factor of the near-field light on the device 2 in the second example having the semiconductor substrate 101 that is made of the mixed crystal including Ga, As and Sb and the metal end 102 that is made of Au. Specifically, FIG. 7 illustrates the relationship between the wavelengths λ of the incident light and the enhancement factor of the near-field light in each of the case where the ratio of Ga, As and Sb is "1:0.8:0.2", the case where the ratio of Ga, As and Sb is "1:0.6:0.4", the case where the ratio of Ga, As and Sb is "1:0.4:0.6" and the case where the ratio of Ga, As and Sb is "1:0.2:0.8". Moreover, FIG. 7 illustrates the relationship between the wavelengths λ and the enhancement factor in each of the case where the semiconductor substrate 101 is made of GaAs that is the first mixed crystal and the case where the semiconductor substrate 101 is made of GaSb that is the second mixed crystal for reference.

When the semiconductor member constituting the semiconductor substrate 101 is GaAs (namely, the first mixed crystal), the enhancement factor of the near-field light is relatively high at a wavelength near the resonance wavelength Rs1 (430 nm) specific to GaAs. Here, when GaSb (namely, the second mixed crystal) is mixed to the semiconductor member constituting the semiconductor substrate 101, the enhancement factor of the near-field light is also relatively high at a wavelength near the resonance wavelength Rs2 (620 nm) specific to GaSb. As a result, the enhancement factor of the near-field light is especially high at an intermediate wavelength between the resonance wavelength Rs1 and the resonance wavelength Rs2. The resonance wavelength Rm (520 nm) specific to Au is the intermediate wavelength between the resonance wavelength Rs1 and the resonance wavelength Rs2, and thus it is possible to effectively increase the enhancement factor of the near-field light at the resonance wavelength Rm specific to Au by using the GaAsSb mixed crystal including GaAs that is the first mixed crystal and GaSb that is the second mixed crystal as the semiconductor member constituting the semiconductor substrate 101, in the second example.

Actually, the local maximum value of the enhancement factor of the near-field light at the resonance wavelength Rm (520 nm) specific to Au increases more as the ratio of Sb that is the third element increases more. For example, the local maximum value of the enhancement factor of the near-field light at the resonance wavelength Rm specific to Au is about 4900, when the semiconductor substrate 101 is made of the semiconductor member (namely, the first mixed crystal) in which the ratio of Ga, As and Sb is "1:1:0". The local maximum value of the enhancement factor of the near-field light at the resonance wavelength Rm specific to Au is about 5200, when the semiconductor substrate 101 is made of the semiconductor member (namely, the mixed crystal including the first mixed crystal and the second mixed crystal) in which the ratio of Ga, As and Sb is "1:0.8:0.2". The local maximum value of the enhancement factor of the near-field light at the resonance wavelength Rm specific to Au is about 5800, when the semiconductor substrate 101 is made of the semiconductor member (namely, the mixed crystal including the first mixed crystal and the second mixed crystal) in which the ratio of Ga, As and Sb is "1:0.6:0.4". The local maximum value of the enhancement factor of the near-field light at the resonance wavelength Rm specific to Au is about 6800, when the semiconductor substrate 101 is made of the semiconductor member (namely, the mixed crystal including the first mixed crystal and the second mixed crystal) in which the ratio of Ga, As and Sb is "1:0.4:0.6". The local maximum value of the enhancement factor of the near-field light at the resonance wavelength Rm specific to Au is about 8000, when the semiconductor substrate 101 is made of the semiconductor member (namely, the mixed crystal including the first mixed crystal and the second mixed crystal) in which the ratio of Ga, As and Sb is "1:0.2:0.8".

By this, when the semiconductor substrate 101 of the device 1 is made of the mixed crystal including the first mixed crystal (GaAs in the second example) having the resonance wavelength Rs1 smaller than the resonance wavelength Rm specific to Au that is the metal member constituting the metal end 102 and the second mixed crystal (GaSb in the second example) having the resonance wavelength Rs2 larger than the resonance wavelength Rm, it is possible to control the enhancement factor of the near-field light at the resonance wavelength Rm specific to the metal member constituting the metal end 102 of the device 1.

Namely, when the semiconductor substrate 101 is made of the mixed crystal including the first element, the second element and the third element, it is possible to control the enhancement factor of the near-field light at the resonance wavelength Rm specific to the metal member constituting the metal end 102 of the device 2 by selecting the metal member and the first to third elements constituting the semiconductor member so that a condition of Rs1<Rm<Rs2 is satisfied, wherein the resonance wavelength of the first mixed crystal including the first element and the second element is Rs1, the resonance wavelength of the second mixed crystal including the first element and the third element is Rs2, and the resonance wavelength specific to the metal member constituting the metal end 102 is Rm. According to the device 2 in the second example, when the incident light having the wavelength that is same as the resonance wavelength Rm (520 nm) specific to Au is emitted from the semiconductor substrate 101 side, the enhancement factor of the near-field light generated at the metal end 102 that is made of Au can be set to be higher, compared to the case where the semiconductor substrate 101 is made of the first mixed crystal (in other words, does not include the second mixed crystal).

(3) A Third Example of a Device

Next, with reference to FIG. 8 and FIG. 9, a device 3 in a third example will be described.

A structure of the device 3 in the third example is same as that of the device 1 in the first example illustrated in FIG. 1. However, in the third example, the semiconductor member constituting the semiconductor substrate 101 and the metal member constituting the metal end 102 are different from those in the first example. In the device 3, the semiconductor member is a mixed crystal including As (arsenic) that is the first element, Al (aluminum) that is the second element and Ga (gallium) that is the third element. Moreover, the metal member is Ag.

FIG. 8 is a graph illustrating a result (a dashed line) of the simulation on the simulation model in which the metal end 102 that is made of Ag is formed on the semiconductor substrate 101 that is made of GaAs (namely, a second mixed crystal including As that is the first element and Ga that is the third element) and a result (a solid line) of the simulation on the simulation model in which the metal end 102 that is made of Ag is formed on the semiconductor substrate 101 that is made of AlAs (namely, a first mixed crystal including As that is the first element and Al that is the second element). The graph in FIG. 8 found that the resonance wavelength Rm specific to Ag is 360 nm, the resonance wavelength Rs1 specific to AlAs that is the first mixed crystal is 350 nm, and the resonance wavelength Rs2 specific to GaAs that is the second mixed crystal is 430 nm. However, the resonance wavelength Rm is relatively close to the resonance wavelength Rs1, and thus, a local maximum point of the enhancement factor of the near-field light at the resonance wavelength Rm cannot be distinguished clearly from a local maximum point of the enhancement factor of the near-field light at the resonance wavelength Rs1.

Next, FIG. 9 is a graph illustrating, as well as a ratio of Al, Ga and As, a relationship between the wavelengths λ of the incident light and the enhancement factor of the near-field light on the device 3 in the third example having the semiconductor substrate 101 that is made of the mixed crystal including Al, Ga and As and the metal end 102 that is made of Ag. Specifically, FIG. 9 illustrates the relationship between the wavelengths λ of the incident light and the enhancement factor of the near-field light in each of the case where the ratio of Al, Ga and As is "0.2:0.8:1", the case where the ratio of Al, Ga and As is "0.4:0.6:1", the case where the ratio of Al, Ga and As is "0.6:0.4:1" and the case where the ratio of Al, Ga and As is "0.8:0.2:1". Moreover, FIG. 9 illustrates the relationship between the wavelengths λ and the enhancement factor in each of the case where the semiconductor substrate 101 is made of AlAs that is the first mixed crystal and the case where the semiconductor substrate 101 is made of GaAs that is the second mixed crystal for reference.

When the semiconductor member constituting the semiconductor substrate 101 is GaAs (namely, the second mixed crystal), the enhancement factor of the near-field light is relatively high at a wavelength near the resonance wavelength Rs2 (430 nm) specific to GaAs. Here, when AlAs (namely, the first mixed crystal) is mixed to the semiconductor member constituting the semiconductor substrate 101, the enhancement factor of the near-field light is also relatively high at a wavelength near the resonance wavelength Rs1 (350 nm) specific to AlAs. As a result, the enhancement factor of the near-field light is especially high at an intermediate wavelength between the resonance wavelength Rs1 and the resonance wavelength Rs2. The resonance wavelength Rm (360 nm) specific to Ag is the intermediate wavelength between the resonance wavelength Rs1 and the resonance wavelength Rs2, and thus it is possible to effectively increase the enhancement factor of the near-field light at the resonance wavelength Rm specific to Ag by using the AlGaAs mixed crystal including GaAs that is the second mixed crystal and AlAs that is the first mixed crystal as the semiconductor member constituting the semiconductor substrate 101, in the third example.

Actually, the local maximum value of the enhancement factor of the near-field light at the resonance wavelength Rm (360 nm) specific to Ag increases more as the ratio of Al that is the second element increases more. For example, the local maximum value of the enhancement factor of the near-field light at the resonance wavelength Rm specific to Ag is about 18800, when the semiconductor substrate 101 is made of the semiconductor member (namely, the second mixed crystal) in which the ratio of Al, Ga and As is "0:1:1". The local maximum value of the enhancement factor of the near-field light at the resonance wavelength Rm specific to Ag is about 17300, when the semiconductor substrate 101 is made of the semiconductor member (namely, the mixed crystal including the first mixed crystal and the second mixed crystal) in which the ratio of Al, Ga and As is "0.2:0.8:1". The local maximum value of the enhancement factor of the near-field light at the resonance wavelength Rm specific to Ag is about 18100, when the semiconductor substrate 101 is made of the semiconductor member (namely, the mixed crystal including the first mixed crystal and the second mixed crystal) in which the ratio of Al, Ga and As is "0.4:0.6:1". The local maximum value of the enhancement factor of the near-field light at the resonance wavelength Rm specific to Ag is about 21300, when the semiconductor substrate 101 is made of the semiconductor member (namely, the mixed crystal including the first mixed crystal and the second mixed crystal) in which the ratio of Al, Ga and As is "0.6:0.4:1". The local maximum value of the enhancement factor of the near-field light at the resonance wavelength Rm specific to Ag is about 26800, when the semiconductor substrate 101 is made of the semiconductor member (namely, the mixed crystal including the first mixed crystal and the second mixed crystal) in which the ratio of Al, Ga and As is "0.8:0.2:1".

Namely, also in the device 3 in the third example, when the semiconductor substrate 101 is made of the mixed crystal including the first element, the second element and the third element, it is possible to control the enhancement factor of the near-field light at the resonance wavelength Rm specific to the metal member constituting the metal end 102 of the device 3 by selecting the metal member and the first to third elements constituting the semiconductor member so that the condition of Rs1<Rm<Rs2 is satisfied, wherein the resonance wavelength of the first mixed crystal including the first element and the second element is Rs1, the resonance wavelength of the second mixed crystal including the first element and the third element is Rs2, and the resonance wavelength specific to the metal member constituting the metal end 102 is Rm. According to the device 3 in the third example, when the ratio of Al and Ga is set to be equal to or larger than "0.6:0.4" (namely, a condition of "Al/Ga≥1.5" is satisfied) and the incident light having the wavelength that is same as the resonance wavelength Rm (360 nm) specific to Ag is emitted from the semiconductor substrate 101 side, the enhancement factor of the near-field light generated at the metal end 102 that is made of Ag can be set to be higher, compared to the case where the semiconductor substrate 101 is made of the second mixed crystal (in other words, does not include the first mixed crystal).

(4) A Fourth Example of a Device

Next, with reference to FIG. 10 and FIG. 11, a device 4 in a fourth example will be described.

A structure of the device 4 in the fourth example is same as that of the device 1 in the first example illustrated in FIG. 1. However, in the fourth example, the semiconductor member constituting the semiconductor substrate 101 and the metal member constituting the metal end 102 are different from those in the first example. In the device 4, the semiconductor member is a mixed crystal including Ga (gallium) that is the first element, P (phosphorus) that is the second element and As (arsenic) that is the third element. Moreover, the metal member is Ag.

FIG. 10 is a graph illustrating a result (a solid line) of the simulation on the simulation model in which the metal end 102 that is made of Ag is formed on the semiconductor substrate 101 that is made of GaP (namely, a first mixed crystal including Ga that is the first element and P that is the second element) and a result (a dashed line) of the simulation on the simulation model in which the metal end 102 that is made of Ag is formed on the semiconductor substrate 101 that is made of GaAs (namely, a second mixed crystal including Ga that is the first element and As that is the third element). The graph in FIG. 10 found that the resonance wavelength Rm specific to Ag is 360 nm, the resonance wavelength Rs1 specific to GaP that is the first mixed crystal is 350 nm, and the resonance wavelength Rs2 specific to GaAs that is the second mixed crystal is 430 nm. However, the resonance wavelength Rm is close to the resonance wavelength Rs1, and thus, a local maximum point of the enhancement factor of the near-field light at the resonance wavelength Rm cannot be distinguished clearly from a local maximum point of the enhancement factor of the near-field light at the resonance wavelength Rs1.

Next, FIG. 11 is a graph illustrating, as well as a ratio of Ga, As and P, a relationship between the wavelengths λ of the incident light and the enhancement factor of the near-field light on the device 4 in the fourth example having the semiconductor substrate 101 that is made of the mixed crystal including Ga, As and P and the metal end 102 that is made of Ag. Specifically, FIG. 11 illustrates the relationship between the wavelengths λ of the incident light and the enhancement factor of the near-field light in each of the case where the ratio of Ga, As and P is "1:0.8:0.2", the case where the ratio of Ga, As and P is "1:0.6:0.4", the case where the ratio of Ga, As and P is "1:0.4:0.6" and the case where the ratio of Ga, As and P is "1:0.2:0.8". Moreover, FIG. 11 illustrates the relationship between the wavelengths λ and the enhancement factor in each of the case where the semiconductor substrate 101 is made of GaP that is the first mixed crystal and the case where the semiconductor substrate 101 is made of GaAs that is the second mixed crystal for reference.

When the semiconductor member constituting the semiconductor substrate 101 is GaAs (namely, the second mixed crystal), the enhancement factor of the near-field light is relatively high at a wavelength near the resonance wavelength Rs2 (430 nm) specific to GaAs. Here, when GaP (namely, the first mixed crystal) is mixed to the semiconductor member constituting the semiconductor substrate 101, the enhancement factor of the near-field light is also relatively high at a wavelength near the resonance wavelength Rs1 (350 nm) specific to GaP. As a result, the enhancement factor of the near-field light is especially high at an intermediate wavelength between the resonance wavelength Rs1 and the resonance wavelength Rs2. The resonance wavelength Rm (360 nm) specific to Ag is the intermediate wavelength between the resonance wavelength Rs1 and the resonance wavelength Rs2, and thus it is possible to effectively increase the enhancement factor of the near-field light at the resonance wavelength Rm specific to Ag by using the GaAsP mixed crystal including GaAs that is the second mixed crystal and GaP that is the first mixed crystal as the semiconductor member constituting the semiconductor substrate 101, in the fourth example.

Actually, the local maximum value of the enhancement factor of the near-field light at the resonance wavelength Rm (360 nm) specific to Ag increases more as the ratio of P that is the second element increases more. For example, the local maximum value of the enhancement factor of the near-field light at the resonance wavelength Rm specific to Ag is about 18800, when the semiconductor substrate 101 is made of the semiconductor member (namely, the second mixed crystal) in which the ratio of Ga, As and P is "1:1:0". The local maximum value of the enhancement factor of the near-field light at the resonance wavelength Rm specific to Ag is about 21000, when the semiconductor substrate 101 is made of the semiconductor member (namely, the mixed crystal including the first mixed crystal and the second mixed crystal) in which the ratio of Ga, As and P is "1:0.8:0.2". The local maximum value of the enhancement factor of the near-field light at the resonance wavelength Rm specific to Ag is about 26400, when the semiconductor substrate 101 is made of the semiconductor member (namely, the mixed crystal including the first mixed crystal and the second mixed crystal) in which the ratio of Ga, As and P is "1:0.6:0.4". The local maximum value of the enhancement factor of the near-field light at the resonance wavelength Rm specific to Ag is about 34900, when the semiconductor substrate 101 is made of the semiconductor member (namely, the mixed crystal including the first mixed crystal and the second mixed crystal) in which the ratio of Ga, As and P is "1:0.4:0.6". The local maximum value of the enhancement factor of the near-field light at the resonance wavelength Rm specific to Ag is about 45900, when the semiconductor substrate 101 is made of the semiconductor member (namely, the mixed crystal including the first mixed crystal and the second mixed crystal) in which the ratio of Ga, As and P is "1:0.2:0.8".

Namely, also in the device 4 in the fourth example, when the semiconductor substrate 101 is made of the mixed crystal including the first element, the second element and the third element, it is possible to control the enhancement factor of the near-field light at the resonance wavelength Rm specific to the metal member constituting the metal end 102 of the device 4 by selecting the metal member and the first to third elements constituting the semiconductor member so that the condition of Rs1<Rm<Rs2 is satisfied, wherein the resonance wavelength of the first mixed crystal including the first element and the second element is Rs1, the resonance wavelength of the second mixed crystal including the first element and the third element is Rs2, and the resonance wavelength specific to the metal member constituting the metal end 102 is Rm. According to the device 4 in the fourth example, when the incident light having the wavelength that is same as the resonance wavelength Rm (360 nm) specific to Ag is emitted from the semiconductor substrate 101 side, the enhancement factor of the near-field light generated at the metal end 102 that is made of Ag can be set to be higher, compared to the case where the semiconductor substrate 101 is made of the second mixed crystal (in other words, does not include the first mixed crystal).

(5) A Fifth Example of a Device

Next, with reference to FIG. 12 and FIG. 13, a device 5 in a fifth example will be described.

A structure of the device 5 in the fifth example is same as that of the device 1 in the first example illustrated in FIG. 1. However, in the fifth example, the semiconductor member constituting the semiconductor substrate 101 and the metal member constituting the metal end 102 are different from those in the first example. In the device 5, the semiconductor member is a mixed crystal including As (arsenic) that is the first element, Ga (gallium) that is the second element and In (Indium) that is the third element. Moreover, the metal member is Au.

FIG. 12 is a graph illustrating a result (a solid line) of the simulation on the simulation model in which the metal end 102 that is made of Au is formed on the semiconductor substrate 101 that is made of GaAs (namely, a first mixed crystal including As that is the first element and Ga that is the second element) and a result (a dashed line) of the simulation on the simulation model in which the metal end 102 that is made of Au is formed on the semiconductor substrate 101 that is made of InAs (namely, a second mixed crystal including As that is the first element and In that is the third element). The graph in FIG. 12 found that the resonance wavelength Rm specific to Au is 520 nm, the resonance wavelength Rs1 specific to GaAs that is the first mixed crystal is 430 nm, and the resonance wavelength Rs2 specific to InAs that is the second mixed crystal is 520 nm. However, the resonance wavelength Rm is close to the resonance wavelength Rs2, and thus, a local maximum point of the enhancement factor of the near-field light at the resonance wavelength Rm cannot be distinguished clearly from a local maximum point of the enhancement factor of the near-field light at the resonance wavelength Rs2.

Next, FIG. 13 is a graph illustrating, as well as a ratio of In, Ga and As, a relationship between the wavelengths λ of the incident light and the enhancement factor of the near-field light on the device 5 in the fifth example having the semiconductor substrate 101 that is made of the mixed crystal including In, Ga and As and the metal end 102 that is made of Au. Specifically, FIG. 13 illustrates the relationship between the wavelengths λ of the incident light and the enhancement factor of the near-field light in each of the case where the ratio of In, Ga and As is "0.2:0.8:1", the case where the ratio of In, Ga and As is "0.4:0.6:1", the case where the ratio of In, Ga and As is "0.6:0.4:1" and the case where the ratio of In, Ga and As is "0.8:0.2:1". Moreover, FIG. 13 illustrates the relationship between the wavelengths λ and the enhancement factor in each of the case where the semiconductor substrate 101 is made of GaAs that is the first mixed crystal and the case where the semiconductor substrate 101 is made of InAs that is the second mixed crystal for reference.

When the semiconductor member constituting the semiconductor substrate 101 is GaAs (namely, the first mixed crystal), the enhancement factor of the near-field light is relatively high at a wavelength near the resonance wavelength Rs1 (430 nm) specific to GaAs. Here, when InAs (namely, the second mixed crystal) is mixed to the semiconductor member constituting the semiconductor substrate 101, the enhancement factor of the near-field light is also relatively high at a wavelength near the resonance wavelength Rs2 (520 nm) specific to InAs. As a result, the enhancement factor of the near-field light is especially high at an intermediate wavelength between the resonance wavelength Rs1 and the resonance wavelength Rs2. The resonance wavelength Rm (520 nm) specific to Au is the intermediate wavelength between the resonance wavelength Rs1 and the resonance wavelength Rs2, and thus it is possible to effectively increase the enhancement factor of the near-field light at the resonance wavelength Rm specific to Au by using the InGaAs mixed crystal including GaAs that is the first mixed crystal and InAs that is the second mixed crystal as the semiconductor member constituting the semiconductor substrate 101, in the fifth example.

Actually, the local maximum value of the enhancement factor of the near-field light at the resonance wavelength Rm (520 nm) specific to Au increases more as the ratio of In that is the third element increases more. For example, the local maximum value of the enhancement factor of the near-field light at the resonance wavelength Rm specific to Au is about 4900, when the semiconductor substrate 101 is made of the semiconductor member (namely, the first mixed crystal) in which the ratio of In, Ga and As is "0:1:1". The local maximum value of the enhancement factor of the near-field light at the resonance wavelength Rm specific to Au is about 5200, when the semiconductor substrate 101 is made of the semiconductor member (namely, the mixed crystal including the first mixed crystal and the second mixed crystal) in which the ratio of In, Ga and As is "0.2:0.8:1". The local maximum value of the enhancement factor of the near-field light at the resonance wavelength Rm specific to Au is about 5600, when the semiconductor substrate 101 is made of the semiconductor member (namely, the mixed crystal including the first mixed crystal and the second mixed crystal) in which the ratio of In, Ga and As is "0.4:0.6:1". The local maximum value of the enhancement factor of the near-field light at the resonance wavelength Rm specific to Au is about 6100, when the semiconductor substrate 101 is made of the semiconductor member (namely, the mixed crystal including the first mixed crystal and the second mixed crystal) in which the ratio of In, Ga and As is "0.6:0.4:1". The local maximum value of the enhancement factor of the near-field light at the resonance wavelength Rm specific to Au is about 6700, when the semiconductor substrate 101 is made of the semiconductor member (namely, the mixed crystal including the first mixed crystal and the second mixed crystal) in which the ratio of In, Ga and As is "0.8:0.2:1".

Namely, also in the device 5 in the fifth example, when the semiconductor substrate 101 is made of the mixed crystal including the first element, the second element and the third element, it is possible to control the enhancement factor of the near-field light at the resonance wavelength Rm specific to the metal member constituting the metal end 102 of the device 5 by selecting the metal member and the first to third elements constituting the semiconductor member so that the condition of Rs1 <Rm <Rs2 is satisfied, wherein the resonance wavelength of the first mixed crystal including the first element and the second element is Rs1, the resonance wavelength of the second mixed crystal including the first element and the third element is Rs2, and the resonance wavelength specific to the metal member constituting the metal end 102 is Rm. According to the device 5 in the fifth example, when the incident light having the wavelength that is same as the resonance wavelength Rm (520 nm) specific to Au is emitted from the semiconductor substrate 101 side, the enhancement factor of the near-field light generated at the metal end 102 that is made of Au can be set to be higher, compared to the case where the semiconductor substrate 101 is made of the first mixed crystal (in other words, does not include the second mixed crystal).

(6) A Modified Example of a Semiconductor Substrate in the Device

Next, with reference to FIG. 14, a modified example of the semiconductor substrate 101 of each of the device 1 in the first example to the device 5 in the fifth example will be described.

FIG. 14 (a) illustrates the semiconductor substrate 101 in which multi quantum walls 101a each of which is made of InAs, for example, are embedded in an area that is relatively closer to the metal end 102 and that is an area of the semiconductor substrate 101 made of GaAs. When bandgaps of the multi quantum walls 101a are set appropriately, an energy of the incident light is stored in the multi quantum walls 101a. As a result, the enhancement factor of the near-field light generated at the metal end 102 increases.

FIG. 14 (b) illustrates the semiconductor substrate 101 in which quantum dot layers 101b each of which is made of InAs, for example, are embedded in an area that is relatively closer to the metal end 102 and that is an area of the semiconductor substrate 101 that is made of GaAs. For example, three to twenty (or more) quantum dot layers 101b may be embedded. When the quantum dot layers 101b are embedded, an energy of the incident light is stored in the quantum dot layers 101b. As a result, the enhancement factor of the near-field light generated at the metal end 102 increases.

FIG. 14 (c) illustrates the semiconductor substrate 101 in which quantum dots 101c each of which is made of InAs are dispersed in whole of the semiconductor substrate 101 that is made of GaAs. When the quantum dots 101c are dispersed, an energy of the incident light is stored in the quantum dots 101c. As a result, the enhancement factor of the near-field light generated at the metal end 102 increases.

Note that the multi quantum walls 101a, the quantum dot layers 101b and the quantum dots 101c may be made of a member that is compatible with the semiconductor member constituting the semiconductor substrate 101, instead of or in addition to InAs. Moreover, the multi quantum walls 101a, the quantum dot layers 101b and the quantum dots 101c may be made of a member that is capable of effectively absorbing the incident light, instead of or in addition to InAs. Moreover, a characteristic (for example, a thickness, a size of the dot and the like) of the member constituting the multi quantum walls 101a, the quantum dot layers 101b and the quantum dots 101c may be set appropriately so that the multi quantum walls 101a, the quantum dot layers 101b and the quantum dots 101c are capable of effectively absorbing the incident light.

FIG. 14(d) illustrate an example in which the semiconductor substrate 101 is a ring resonator (namely, a shape of the semiconductor substrate 101 is a disc-like shape). The semiconductor substrate 101 may be made of GaAs, for example, or may be the semiconductor substrate 101 illustrated in FIG. 14(a) to FIG. 14(c). When the semiconductor substrate 101 is the ring resonator, the enhancement factor of the near-field light generated at the metal end 102 can be increased more.

(7) A First Example of a Magnetic Head as a Recording Apparatus

Next, with reference to FIG. 15, an example in which the above described device 1 in the first example is applied to a magnetic head for performing a heat assisted magnetic recording will be described. FIG. 15 is a side view illustrating a magnetic head 100 in the first example that has the above described device 1 in the first example.

As illustrated in FIG. 15, the magnetic head 100 is provided with: the semiconductor substrate 101; the metal end 102 that is configured to serve as a NFT (Near Field Transducer); the dielectric material 103; a semiconductor laser 104; a magnetic pole 105; a reading magnetic pole 106; a writing magnetic pole 107; a head base unit 108; and an arm 109. Note that a distance between the metal end 102 and a magnetic recording medium 200 is set to be a distance (for example, 20 nm or less) in which a near-field light interaction arises.

The semiconductor laser 104 is a VCSEL (Vertical Cavity Surface Emitting LASER), for example. By this, a light waveguide is not needed, and thus an efficiency of the usage of the light improves.

The semiconductor laser 104 emits, to the semiconductor substrate 101, a laser light having a wavelength that is same as the resonance wavelength Rs specific to the semiconductor member constituting the semiconductor substrate 101. As a result, as described in the above first example, the enhancement factor of the near-field light generated at the metal end 102 becomes relatively high. The emitted incident light passes through the semiconductor substrate 101 and then is irradiated to the metal end 102. The energy of the incident light is transferred to the metal end 102, and thus, a plasmon resonance occurs at the metal end 102. As a result, the near-field light is generated around an edge of the metal end 102. This near-field light heats a partial area of the magnetic recording medium 200. The heat assisted magnetic recording is performed in this manner.

Note that, needless to say, any one of the device 2 in the second example to the device 5 in the fifth example may be applied to the magnetic head 100, instead of the device 1 in the first example, by adjusting the wavelength of the laser light emitted from the semiconductor laser 104. When any one of the device 2 in the second example to the device 5 in the fifth example is applied to the magnetic head 100, it is preferable that the semiconductor laser 104 emit the laser light having the wavelength that is same as the resonance wavelength Rm of the metal member constituting the metal end 102.

In the simulation illustrated in FIG. 2, a permittivity of a bulk semiconductor and a permittivity of a bulk metal are used as a permittivity of the semiconductor member constituting the semiconductor substrate 201 and a permittivity of the metal member constituting the metal end 202, respectively. However, actually, the permittivity of the semiconductor member and the permittivity of the metal member depends on a size of the semiconductor substrate 201 and a size of the metal end 202, respectively, and are different from the permittivity of the bulk semiconductor and the permittivity of the bulk metal, respectively. Therefore, the relationship between the wavelengths λ of the incident light and the enhancement factor of the near-field light in the device 1 in the first example is different from the result of the simulation illustrated in FIG. 5, for example. Thus, the wavelength of the laser light in the magnetic head 100 is set to be a wavelength by which the enhancement factor of the near-field light is locally maximized by appropriately correcting the result of the simulation illustrated in FIG. 5.

(8) A Second Example of a Magnetic Head as a Recording Apparatus

Next, with reference to FIG. 16, another example in which the above described device 1 in the first example is applied to the magnetic head for performing the heat assisted magnetic recording will be described. FIG. 16 is a side view illustrating a magnetic head 100a in the second example that has the above described device 1 in the first example. Note that same reference sign is assigned to a component that is same as a component of the magnetic head 100 in the first example.

As illustrated in FIG. 16, the magnetic head 100a is different from the magnetic head 100 in that the magnetic head 100a is provided with a spacer 110 that is made of a dielectric material and the like, instead of the semiconductor laser 104. Moreover, the magnetic head 100a s different from the magnetic head 100 in that the magnetic head 100a is provided with: a first electrode 111 that is formed on a surface of the semiconductor substrate 101 at the spacer 110 side; and a second electrode 112 that is formed on a surface of the semiconductor substrate 101 at the metal end 102 side. The first electrode 111 and the second electrode 112 are made of a conductive material, and a current is supplied thereto from not-illustrated power source. Note that the heat assisted magnetic recording is performed in the same manner as the magnetic head 100 in FIG. 15.

When the current is supplied to the semiconductor substrate 101 via the first electrode 111 and the second electrode 112, the semiconductor substrate 101 emits the laser light having the wavelength that is same as the resonance wavelength Rs specific to the semiconductor member constituting the semiconductor substrate 101. As a result, the laser light is irradiated to the metal end 102.

Note that the semiconductor substrate 101 may be the semiconductor substrate 101 illustrated in FIG. 14(a) to FIG. 14(c). However, in this case, there is a possibility that InAs constituting the multi quantum walls 101a, the quantum dot layers 101b and the quantum dots 101c varies the resonance wavelength Rs from the resonance wavelength (430 nm) specific to GaAs constituting the semiconductor substrate 101. However, a percentage of the multi quantum walls 101a, the quantum dot layers 101b and the quantum dots 101c with respect to whole of the semiconductor substrate 101 is few and the resonance wavelength Rs specific to the semiconductor member constituting the semiconductor substrate 101 may be presumed to be hardly affected.

Note that the wavelength λ of the laser light emitted from the semiconductor substrate 101 is adjusted by adjusting the bandgap of the multi quantum walls 101a and a material or a size of the quantum dot layers 101b and the quantum dots 101c. Any one of the device 2 in the second example to the device 5 in the fifth example can be applied to the magnetic head 100a, instead of the device 1 in the first example, by adjusting the wavelength λ of the laser light emitted from the semiconductor substrate 101.

(9) An Example of a Hard Disk Drive as a Recording Apparatus

Next, with reference to FIG. 17, an example in which the above described device 1 in the first example is applied to a hard disk drive for performing the heat assisted magnetic recording will be described. FIG. 17 is a block diagram illustrating a hard disk drive 150.

As illustrated in FIG. 17, the hard disk drive 150 is provided with: a CPU (Central Processing Unit) 11; a head 12; a position adjusting unit 13; output adjusting units 14 and 15; a data reading unit 16; and a rotation adjusting unit 17. Note that the head 12 is provided with: a magnetic pole 1210 for reading and writing; a device 1220 that corresponds to the device 1 in the first example; an energy source 1230 that has the semiconductor laser and the like; and a photodetector 1240 for monitoring whether or not the near-field light is generated at the device 1220.

The CPU 11 controls the energy source 1230 via the output adjusting unit 15 and controls the magnetic pole 1210 via the output adjusting unit 14 on the basis of a recording information that is to be recorded to a recording medium 50. As a result, the CPU 11 is capable of continuously recording the recording information on the recording medium 50 that is rotated at a constant speed by an adjustment of the rotation adjusting unit 17. The energy source 1230 emits the energy of the laser light having the wavelength that is same as the resonance wavelength Rs of the semiconductor member constituting the semiconductor substrate 101 of the device 1220. This energy is transferred to the metal end 102 that is made of the alloy including Au and Ag. As a result, the plasmon resonance occurs at the metal end 102. As a result, the near-field light is generated around an edge of the metal end 102. This near-field light heats a partial area of the recording medium 50. The hard disk drive 150 performs the heat assisted magnetic recording in this manner, as with the description of the magnetic head in FIG. 15 and FIG. 16.

Moreover, when the information is read from the recording medium 50, the magnetic pole 1210 detects the change of the magnetic field due to a recorded magnetic mark and the detection result is demodulated by the data reading unit 16.

The present invention is not limited to the above described example, and various changes may be made, if desired, without departing from the essence or spirit of the invention which can be read from the claims and the entire specification. A device and a recording apparatus, which involve such changes, are also intended to be within the technical scope of the present invention.

DESCRIPTION OF REFERENCE CODES 1 device
101 semiconductor substrate
102 metal end
103 dielectric material
104 semiconductor laser
105 magnetic pole
106 reading magnetic pole
107 writing magnetic pole
108 head base unit
109 arm
200 magnetic recording medium

The invention claimed is:

1. A device comprising:
a semiconductor member; and
a metal member that is formed on the semiconductor member, a near-field light being generated at the metal member when an energy is supplied to the semiconductor member, the metal member being comprised of an alloy including a first metal and a second metal,
wherein a condition of Rm1 <Rs <Rm2 is satisfied, a resonance wavelength of the first metal being Rm1, a resonance wavelength of the second metal being Rm2, and a resonance wavelength of the semiconductor member being Rs.

2. A device comprising:
a semiconductor member; and
a metal member that is formed on the semiconductor member, a near-field light being generated at the metal member when an energy is supplied to the semiconductor member,
wherein the semiconductor member is comprised of a mixed crystal including a first element, a second element and a third element, and
a condition of Rs1 <Rm <Rs2 is satisfied, a resonance wavelength of a first mixed crystal including the first element and the second element of the mixed crystal being Rs1, a resonance wavelength of a second mixed crystal including the first element and the third element of the mixed crystal being Rs2, and a resonance wavelength of the metal member being Rm.

3. The device according to claim 1, wherein
the resonance wavelength is a wavelength that is specific to a member and at which an enhancement factor of the near-field light becomes locally maximum.

4. A device comprising:
a semiconductor member; and
a metal member that is formed on the semiconductor member, a near-field light being generated at the metal member when an energy is supplied to the semiconductor member, the metal member being comprised of an alloy in which at least a first metal and a second metal are mixed at a predetermined mixing ratio.

5. The device according to claim 4, wherein
the first metal is a gold (Au) and the second metal is a silver (Ag).

6. The device according to claim 4, wherein
the semiconductor member is comprised of GaAs.

7. A device comprising:
a semiconductor member; and
a metal member that is formed on the semiconductor member, a near-field light being generated at the metal member when an energy is supplied to the semiconductor member,
wherein the semiconductor member is comprised of a mixed crystal including at least a first element, a second element and a third element.

8. The device according to claim 7, wherein
the first element is Ga, the second element is As, and the third element is In, Al, Sb or P.

9. The device according to claim 7, wherein
the metal member is a gold (Au) or a silver (Ag).

10. A recording apparatus comprising the device according to claim 1.

11. The recording apparatus according to claim 10, further comprising a light source that is configured to irradiate the semiconductor member with a light having a predetermined wavelength.

12. The recording apparatus according to claim 11, wherein
the predetermined wavelength is a resonance wavelength of the semiconductor member or a resonance wavelength of the metal member.

13. The recording apparatus according to claim 10, further comprising a pair of electrodes that are connected to the semiconductor member.

14. The recording apparatus according to claim 12, further comprising a writing magnetic pole.

15. A recording apparatus comprising:
a recording head that is configured to record information on a disc;
a rotating mechanism that is configured to rotate the disc; and
a controlling device that is configured to control the recording head and the rotating mechanism,
the recording head having the device according to claim 1.

16. A recording apparatus comprising the device according to claim 2.

17. A recording apparatus comprising the device according to claim 4.

18. A recording apparatus comprising the device according to claim 7.

19. A recording apparatus comprising:
a recording head that is configured to record information on a disc;
a rotating mechanism that is configured to rotate the disc; and
a controlling device that is configured to control the recording head and the rotating mechanism,
the recording head having the device according to claim 2.

20. A recording apparatus comprising:
a recording head that is configured to record information on a disc;
a rotating mechanism that is configured to rotate the disc; and
a controlling device that is configured to control the recording head and the rotating mechanism,
the recording head having the device according to claim 4.

21. A recording apparatus comprising:
a recording head that is configured to record information on a disc;
a rotating mechanism that is configured to rotate the disc; and
a controlling device that is configured to control the recording head and the rotating mechanism,
the recording head having the device according to claim 7.

* * * * *